United States Patent
Abei et al.

(10) Patent No.: US 9,170,750 B2
(45) Date of Patent: Oct. 27, 2015

(54) STORAGE APPARATUS AND DATA COPY CONTROL METHOD

(71) Applicant: Hitachi, Ltd., Tokyo (JP)

(72) Inventors: Hiroshi Abei, Yokohama (JP); Koji Sonoda, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 246 days.

(21) Appl. No.: 13/992,535

(22) PCT Filed: Apr. 22, 2013

(86) PCT No.: PCT/JP2013/002702
§ 371 (c)(1),
(2) Date: Jun. 7, 2013

(87) PCT Pub. No.: WO2014/174548
PCT Pub. Date: Oct. 30, 2014

(65) Prior Publication Data
US 2014/0317367 A1 Oct. 23, 2014

(51) Int. Cl.
*G06F 3/06* (2006.01)

(52) U.S. Cl.
CPC ............... *G06F 3/065* (2013.01); *G06F 3/061* (2013.01); *G06F 3/0614* (2013.01); *G06F 3/0683* (2013.01); *G06F 3/0685* (2013.01)

(58) Field of Classification Search
None
See application file for complete search history.

(56) References Cited

U.S. PATENT DOCUMENTS

| 7,441,091 | B2 | 10/2008 | Sogabe | |
|---|---|---|---|---|
| 7,809,873 | B2 * | 10/2010 | Perry et al. | 710/110 |
| 2006/0041702 | A1 * | 2/2006 | Greenberger | 710/306 |
| 2007/0156989 | A1 * | 7/2007 | Man et al. | 711/165 |
| 2013/0166670 | A1 * | 6/2013 | Wayda et al. | 709/213 |

* cited by examiner

*Primary Examiner* — Gary Portka
(74) *Attorney, Agent, or Firm* — Foley & Lardner LLP

(57) ABSTRACT

A storage apparatus comprises a storage controller and multiple storage devices. The storage controller sends, to either a storage device which is a copy source of copy-target data, or a storage device which is a copy destination of the copy-target data, a copy indication showing areas of the copy source and the copy destination, and the storage device, which receives the copy indication, copies data of the copy-source area to the copy-destination area based on the copy indication without going through the storage controller.

20 Claims, 27 Drawing Sheets

LU configuration management table
600

| LU# | RG# | LU start address | LU size | Package # |
|---|---|---|---|---|
| 1 | 0 | 0x00000000 | 100GB | 0 |
| 2 | 0 | 0x10000000 | 200GB | 1 |
| 3 | 5 | 0x00000000 | 100GB | 27 |
| 4 | 3 | 0x20000000 | 500GB | 21 |
| 5 | 2 | 0x1000000 | 500GB | Unallocated |

Fig. 4

RG configuration management table
700

| RG# | Package # | RAID level |
|---|---|---|
| 0 | 0,1,2,3 | RAID5 |
| 1 | 8,9,10,11,12, 13,1,4,15 | RAID6 |
| 2 | Unallocated | - |
| 3 | 21,22,23,24 | RAID5 |
| 4 | 35,36,37,38 | RAID5 |

FMPK management table
800

| Package # | Group # | PDEV type |
|---|---|---|
| 0 | 0 | FMPK |
| 1 | 1 | FMPK |
| 2 | 2 | FMPK |
| 3 | 3 | FMPK |
| 4 | 0 | SSD |

Package-side copy-enabling condition information
900

| Group condition (901) | Yes/No (902) | Function support condition (903) | Yes/No (904) | Copy process advisability (905) |
|---|---|---|---|---|
| Are copy-source/copy-destination packages located in same group? | Yes | Is/are copy-source and/or copy-destination FMPK comprising a direct copy function? | Yes | Yes |
| | No | | Yes | No |
| | Yes | | No | No |
| | No | | No | No |

PP status management table
1200

| PP number | PP status |
|---|---|
| 0 | Valid |
| 1 | Free |
| 2 | Invalid |
| 3 | Free |
| 4 | Valid |
| 5 | Valid |

Fig. 10

Logical-physical translation table 1500

S15-1

| | 1501 | 1502 | 1503 | 1504 |
|---|---|---|---|---|
| | LP# | PP#1 | PP#2 | Copy status |
| CS | 0 | 100 | Unallocated | — |
| | 1 | 300 | Unallocated | — |
| | 2 | 400 | Unallocated | — |
| CD | ⋮ | ⋮ | ⋮ | — |
| | 100 | 500 | Unallocated | — |

S15-2

| | 1501 | 1502 | 1503 | 1504 |
|---|---|---|---|---|
| | LP# | PP#1 | PP#2 | Copy status |
| CS | 0 | 100 | Unallocated | — |
| | 1 | 300 | 800 | Copy in progress |
| | 2 | 400 | Unallocated | — |
| CD | ⋮ | ⋮ | ⋮ | — |
| | 100 | 800 | 300 | Copy in progress |

S15-3

| | 1501 | 1502 | 1503 | 1504 |
|---|---|---|---|---|
| | LP# | PP#1 | PP#2 | Copy status |
| CS | 0 | 100 | Unallocated | — |
| | 1 | 300 | Unallocated | — |
| | 2 | 400 | Unallocated | — |
| CD | ⋮ | ⋮ | ⋮ | — |
| | 100 | 800 | Unallocated | — |

Fig. 11

Read process information
1600

| Copy status | Copy-source page read process | Copy-destination page read process |
|---|---|---|
| Copy in progress | Read from copy-source physical page | Read from copy-source physical page |
| Copy complete | Read from copy-source physical page | Read from copy-destination physical page |

Write process information
1800

| Copy status (1801) | Copy-source page write process (1802) | Copy-destination page write process (1803) |
|---|---|---|
| Copy in progress | ·Map to copy-source logical page<br>·copy-destination physical page mapped to copy-destination physical page | ·Write write-data to free page and map to copy-destination logical page |
| Copy complete | Write to target physical page (copy source) | Write to target physical page (copy destination) |

Fig. 20

Logical-physical translation table
1500

S21-1

| LP# | PP#1 | PP#2 | Copy status |
|---|---|---|---|
| 0 | 100 | Unallocated | — |
| 1 | 300 | Unallocated | — |
| 2 | 400 | Unallocated | — |
| ⋮ | ⋮ | ⋮ | — |
| 100 | 500 | Unallocated | — |

CS: rows 0,1,2
CD: row 100

⇩

S21-2

| LP# | PP#1 | PP#2 | Copy status |
|---|---|---|---|
| 0 | 100 | Unallocated | — |
| 1 | 300 | 800 | Copy in progress |
| 2 | 400 | Unallocated | — |
| ⋮ | ⋮ | ⋮ | — |
| 100 | 800 | 300 | Copy in progress |

Switch to invalid page

⇩

S21-3

| LP# | PP#1 | PP#2 | Copy status |
|---|---|---|---|
| 0 | 100 | Unallocated | — |
| 1 | 1000 | Unallocated | — |
| 2 | 400 | Unallocated | — |
| ⋮ | ⋮ | ⋮ | — |
| 100 | 300 | Unallocated | — |

1501　1502　1503　1504

STORAGE APPARATUS AND DATA COPY CONTROL METHOD

TECHNICAL FIELD

The present invention relates to a data copy process performed inside a storage device and/or between storage devices.

BACKGROUND ART

Amount of data stored in a storage apparatus is increasing every year. Since the storage apparatus stores mass data, the storage apparatus is equipped with many physical storage devices, and a storage controller (hereinafter, ST-CL) controls read/write of the data to a storage device (TO processing). The ST-CTL, for example, controls the physical storage devices, such as SSDs (Solid State Drives) and HDDs (Hard Disk Drives), as RAID groups, and provides a volume which is logical storage space to a host computer (hereinafter, host). Although the ST-CTL provides a host with multiple volumes, the capacity of each volume is also increasing with increase of data volume.

In the storage apparatus, for example, disaster recovery and/or failure processing, the duplicate of volume is created. And the ST-CTL copies the data, stored in one or more physical storage devices which constitute a volume and the duplicate of the volume, within a physical storage device and/or between physical storage devices.

For example, in a data copy process between physical devices, the ST-CTL, which is a higher-level apparatus with respect to the physical storage device, for example, reads copy-target data (hereinafter, target data) from the physical storage device of the copy source in accordance with an indication from the host, stores the read target data in a cache memory controlled by the ST-CTL, and writes the target data, which has been stored in the cache memory, to the physical storage device of the copy destination (for example, refer to Patent Literature 1).

CITATION LIST

Patent Literature

PTL 1: U.S. Pat. Description No. 7,441,091

SUMMARY OF INVENTION

Technical Problem

In data copy processing of the Patent Literature 1, in order that the ST-CTL may copy data, during a copy, load is applied to the ST-CTL and the performance of I/O (Input/Output) processing declines. Since the amount of data stored in the storage apparatus is increasing every year, there is a problem that it takes a long time to carry out a volume copy and span of declined 10 processing performance of the ST-CTL increases. Moreover, since the ST-CTL manage multiple volumes, load influence I/O processing performance to other volumes, if the load is applied by the copy of a certain volume.

A data copy is not only for disaster recovery, but rather is also performed when migrating data, such as in a snapshot and/or migration operation, and as such, there is a tendency for the ST-CTL copy load to increase even further.

Solution to Problem

A storage apparatus comprises an ST-CTL and multiple storage devices. A storage controller sends, to either a storage device which is a copy source of copy-target data, or a storage device which is a copy destination of the copy-target data, a copy indication showing areas of the copy source and the copy destination, and the storage device, which receives the copy indication, copies data of the copy-source area to the copy-destination area based on the copy indication without going through the storage controller.

Advantageous Effects of Invention

It is possible to reduce the load of the storage controller executing data copy processing. Thus, it is possible to prevent the declining of I/O processing performance under data copy in the storage apparatus.

BRIEF DESCRIPTION OF DRAWINGS

FIG. 4 shows an example of RG configuration management table 700.

FIG. 5 shows an example of a FMPK management table 800.

FIG. 6 shows an example of package-side copy-enabling condition information 900.

FIG. 10 shows a logical-physical translation table 1500 managed by the FMPK 21 and transitions in the status of the logical-physical translation table 1500 during copying inside the same FMPK 21.

FIG. 11 shows an example of read process information 1600.

FIG. 12 shows an example of write process information 1800.

FIG. 20 shows transitions in the state of the logical-physical translation table 1500 in a case where a write command has been received for a copy-source logical page during a copy process inside the same FMPK 21.

DESCRIPTION OF THE EMBODIMENT

Figure 1:
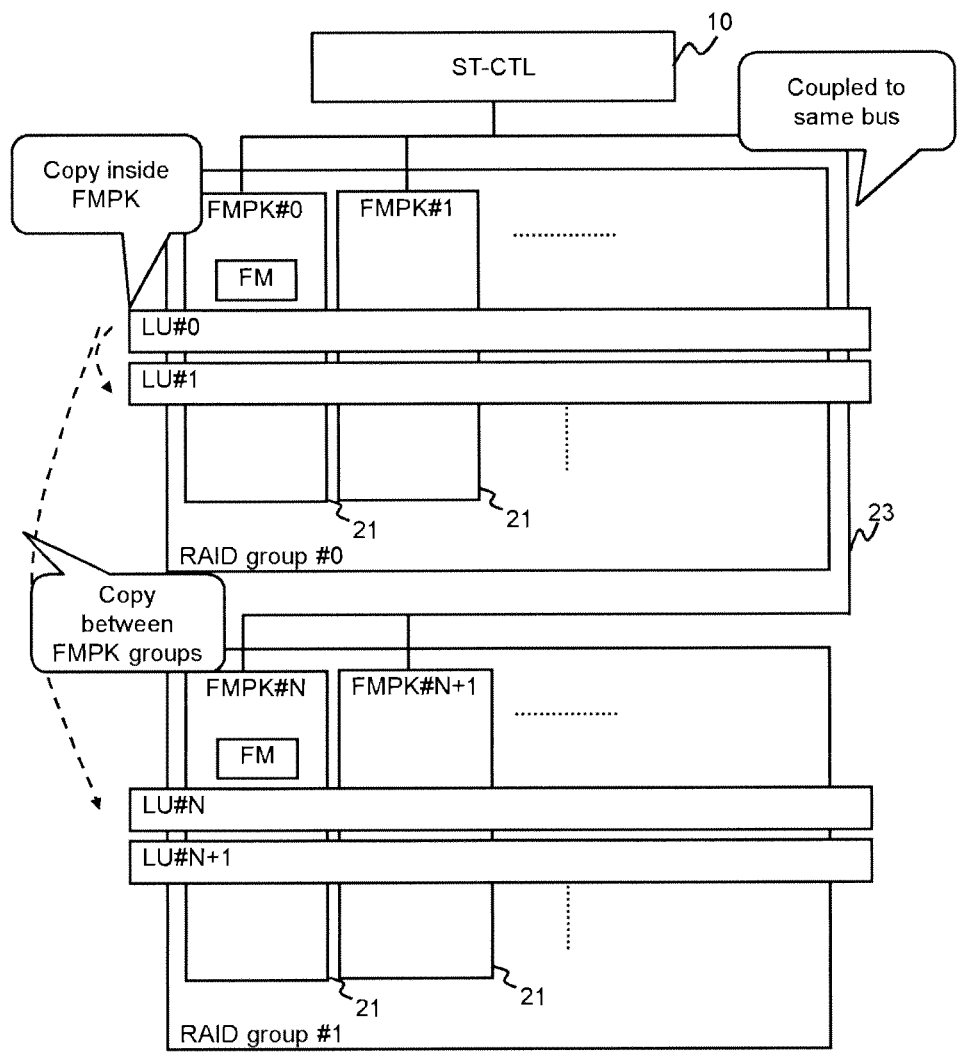
FIG. 1 is a schematic diagram for explaining a copy process related to a first example.

The examples explained hereinbelow do not limit the invention related to the claims, and not all of the elements and combinations thereof explained in the examples are essential for the solution provided by the invention.

In the following explanation, various information is explained using the expression "aaa table", but the various information may also be expressed using a data structure other than a table. To show that this information is not dependent on the data structure, "aaa table" can be called "aaa information".

In the following explanation, at least one controller from among a RAID controller and a memory controller may be a processor (for example, a CPU (Central Processing Unit)) for executing a computer program, or may include a processor and another device (for example, a memory) or dedicated hardware for performing a prescribed process. The computer program may be installed from a program source in either the RAID controller or the memory controller. The program source, for example, may be either a program delivery server or a portable storage media.

In the following explanation, identification information for an element (for example, a LU or physical page) is a number, but an element may be identified using another type of information either instead of or in addition to a number.

In the following explanation, in a case where the same type of element is explained without distinguishing between elements, a reference sign is used (for example, "FMPK 21" will be written), and in a case where the same type element is explained by distinguishing between elements, a serial number is used in place of the reference sign (for example, "FMPK #0" may be written).

In the following explanation, a nonvolatile semiconductor storage medium is a NAND-type flash memory as was explained hereinabove. Thus, the terms page and block are used. Also, in a case where a certain logical area (referred to as "target logical area" in this paragraph) is a write destination, and, in addition, a page (referred to as "first page" in this paragraph) has already been allocated to the target logical area, a free page (referred to as "second page" in this paragraph) is allocated to the target logical area in place of the first page, and data is written to the second page. The data, which is written to the second page, is the latest data for the target logical area, and the data, which is stored in the first page, becomes the old data for the target logical area. Hereinbelow, the latest data may be referred to as "valid data" and the old data may be referred to as "invalid data" for each logical area. Furthermore, a page, which stores the valid data, may be referred to as "valid page", and a page, which stores the invalid data, may be referred to as "invalid page".

The following terminology will be used in the specification.

(*) "PDEV" is the abbreviation for a physical storage device (typically a nonvolatile storage device). The PDEV, for example, comprises a storage medium (typically a nonvolatile storage medium) and a controller for controlling an I/O (Input/Output) of data thereto. A nonvolatile storage medium may be a hard disk group (one or more hard disks) or a NVM group (one or more nonvolatile semiconductor memories (NVM)). That is, the PDEV, for example, may be a NVM device, such as a HDD (Hard Disk Drive) or a flash memory (FM) device (for example, a SSD (Solid State Device)). The NVM, for example, may be a FM. The FM may be a write once read many-type FM, and, for example, may comprise multiple blocks (physical blocks), and each block may comprise multiple pages (physical pages). The NVM (typically a FM) may be a type of NVM (for example, a NAND-type FM) in which data is written in page units, data cannot be written to the page until the data in the page has been erased, and the data is erased in block units. However, the NVM may be another type of write once read many NMV, for example, a MRAM (Magnetic Random Access Memory: magnetic resistance memory), a PRAM (Phase Change Random Access Memory: phase change memory), or a ReRAM (Resistance Random Access Memory: resistance change memory).

(*) "Logical page" may refer to a page, which comprises a logical space provided by the NVM (typically a FM), and "physical page" may refer to a page, which comprises a physical area of the NVM (typically a FM). Furthermore, "free page" refers to a physical page to which data is capable of being written, "valid page" refers to a physical page in which valid data is being stored, and "invalid page" refers to a physical page in which invalid data is being stored. For a certain logical page, "valid data" is the latest data, which was written to the logical page, and "invalid data" is the data, which has become old data as a result of the valid data having been written to the logical page.

(*) "VOL" is the abbreviation for a logical volume, and is a logical storage device (may be called a logical unit (LU)). The VOL may be a real VOL (RVOL) or a virtual VOL (VVOL). Furthermore, the VOL may be an online VOL, which is provided to an external apparatus (for example, a host computer) coupled to the storage apparatus comprising this VOL, or an offline VOL, which is not provided to an external apparatus (is not recognized by the external apparatus). The "RVOL" is a VOL, which is based on a physical storage resource (for example, a RAID (Redundant Array of Independent (or Inexpensive) Disks) group, which comprises multiple PDEV (nonvolatile physical storage devices)) of the storage apparatus that comprises this RVOL. As the "VVOL", for example, there may be an externally coupled VOL (EVOL), which is a storage virtualization technology-compliant VOL that is based on a storage resource (for example, a logical volume) of an external storage apparatus coupled to the storage apparatus comprising this VVOL, or a capacity virtualization technology (typically Thin Provisioning)-compliant VOL (TPVOL), which comprises multiple virtual segments (virtual storage areas). The TPVOL is typically an online VOL. A real segment is allocated to the TPVOL from a pool. The "pool" is a storage resource, which comprises multiple real segments (real storage areas). The pool, for example, comprises multiple pool VOLs, and each pool VOL is partitioned into multiple real segments. The "pool VOL" is a VOL, which is a component of the pool. The pool VOL may be a RVOL or an EVOL. The pool VOL is typically an offline VOL.

(*) "PVOL" is the abbreviation for a primary VOL, and typically is a copy-source VOL. "SVOL" is the abbreviation for a secondary VOL, and typically is a VOL, which comprises a pair with a PVOL, and which is a copy-destination of the PVOL data.

Example 1

FIG. 1 is a schematic diagram for explaining a copy process related to a first example.

A storage apparatus 1 comprises a ST-CTL 10 and multiple FM (Flash Memory) packages (FMPK) 21. Multiple FMPK 21 are connected to the same bus 23. FMPKs 21 connected to the same bus 23 can communicate each other, without passing ST-CTL 10. That is, a FMPK 21 can transmit/receive of data or control information to/from a FMPK or a HDD connected to the same bus.

In a copy process related to the first example, data of a FMPK 21 copy-source area is copied to a FMPK 21 copy-destination area either inside the same FMPK 21 or between FMPKs 21 without going through the ST-CTL 10. Furthermore, in a case where a RAID (Redundant Array of Independent (or Inexpensive) Disks) group has been configured from the multiple FMPKs 21, a copy process inside an FMPK 21 is performed between FM chips comprising the inside the same FMPK 21. A copy process between FMPKs 21 is performed between FMPKs 21 (units of LUs (Logical Units)) comprising RAID groups of the same level.

A copy process inside a FMPK 21 and between FMPKs 21 may be performed in response to the ST-CTL 10 having received a copy indication from the host computer 2 (hereinafter, host copy indication), and may be performed without the ST-CTL 10 receiving a host copy indication. In the following explanation, it is supposed that a copy process is performed principally by the ST-CTL 10 receiving a host copy indication from the host computer 2. In addition, each of a copy-source area and a copy-destination area (for example, logical volume) is specified in a host copy indication, and respectively refer to a "host-specified copy-source area" and a "host-specified copy-destination area". Each of the host-specified copy-source area (for example, logical volume) and the host-specified copy-destination area, for example, are expressed using information, which includes a LU # and a LBA (Logical Block Address) of the LU. The source from which the copy indication is sent to the ST-CTL 10 may be an external apparatus other than the host computer 2, for example, a management computer for managing the storage apparatus 1, but in the following explanation it is supposed that the source is the host computer 2.

The ST-CTL 10, which has received a host copy indication, selects a target FMPK 21 on the basis of the host copy indication, and sends a copy indication to the selected FMPK 21. Hereinbelow, the copy indication sent to the FMPK 21 by the ST-CTL 10 will be referred to as "CTL copy indication". Each of a copy-source area and a copy-destination area is also specified in the CTL copy indication, and respectively refer to a "CTL-specified copy-source area" and a "CTL-specified copy-destination area". The CTL-specified copy-source area and the CTL-specified copy-destination area, for example, is each expressed using information, which includes at least a LBA (Logical Block Address) of the FMPK 21. The FMPK 21 comprising the CTL-specified copy-source area is the copy-source FMPK 21, and the FMPK 21 comprising the CTL-specified copy-destination area is the copy-destination FMPK 21.

Information denoting the CTL-specified copy-destination area, which is associated with the CTL copy indication sent to the copy-source FMPK 21, includes a package # (number) for the copy-destination FMPK 21 in addition to the copy-destination FMPK 21 LBA. In a case where the copy-source FMPK 21 has received a CTL copy indication, a write indication (a write indication specifying the CTL-specified copy-destination area) for data inside the CTL-specified copy-source area is sent from the copy-source FMPK 21 to the FMPK 21 denoted by the copy-destination FMPK 21 package #, and in accordance with this, a process for copying data from the CTL-specified copy-source area to the CTL-specified copy-destination area is performed.

Alternatively, information denoting the CTL-specified copy-source area, which is associated with the CTL copy indication sent to the copy-destination FMPK 21, includes a package # for the copy-source FMPK 21 in addition to the copy-source FMPK 21 LBA. In a case where the copy-destination FMPK 21 has received a CTL copy indication, a read indication specifying the CTL-specified copy-source area is sent from the copy-destination FMPK 21 to the FMPK 21 denoted by the copy-source FMPK 21 package #, and in accordance with this, a process for copying data from the CTL-specified copy-source area to the CTL-specified copy-destination area is performed.

The CTL-specified copy-source area is a storage area in the copy-source FMPK 21, which constitutes the basis of the host-specified copy-source area (for example, a portion of the host-specified copy-source area), and the CTL copy-destination area is a storage area in the copy-destination FMPK 21, which constitutes the basis of the host-specified copy-destination area (for example, a portion of the host-specified copy-destination area).

The ST-CTL 10, when selecting an FMPK 21 on the basis of the host copy indication, determines whether or not the copy-source FMPK 21 (copy-source RAID group) constituting the basis of the host-specified copy-source area is the same as the copy-destination FMPK 21 (copy-destination RAID group) constituting the basis of the host-specified copy-destination area.

In a case where the copy-source FMPK 21 (copy-source RAID group) and the copy-destination FMPK 21 (copy-destination RAID group) are the same, the ST-CTL 10 sends a CTL copy indication to the FMPKs 21. In this case, the copy process is performed inside the FMPKs 21.

Alternatively, in a case where the copy-source FMPK 21 (copy-source RAID group) and the copy-destination FMPK 21 (copy-destination RAID group) differ, the ST-CTL 10 sends a CTL copy indication to either the copy-source FMPK 21 or the copy-destination FMPK 21. In this case, the copy process is performed between the FMPKs 21. For example, when the ST-CTL 10 receives a copy-direction of a logical volume from the host computer 2, the ST-CTL 10 specifies multiple FMPK 21 which constitute the logical volume, and transmits a copy-direction to each of the multiple FMPK 21. FMPK 21 which received the copy-direction copies data within the same FMPK 21, or transmits and receives data between another FMPK 21.

An overview of a copy process inside a FMPK 21 and a copy process between FMPK groups will be explained hereinbelow.

—Copy Process Inside FMPK 21—

In a copy process inside an FMPK 21, the copying of data is performed inside the same FMPK 21. That is, in a copy process inside the FMPK 21, the FM-CTL 10 in the FMPK 21 reads the copy-source area data from the FM chip (physical page) of the copy source inside the FMPK 21, and writes the copy-source area data, which has been read, to the FM chip (physical page), which is the copy-destination area inside the same FMPK 21. This makes it possible to perform copying without going through the ST-CTL 10, enabling the copy load on the ST-CTL 10 to be reduced.

—Copy Process Between FMPK Groups—

As used here, an FMPK group is an aggregate of multiple (or one) FMPKs 21. A RAID group is one example of a FMPK group. A copy process between FMPK groups is a process for copying the data of a copy-source area from multiple FMPKs 21 comprising a copy-source FMPK group to multiple FMPKs 21 comprising a copy-destination FMPK group. The copy-destination FMPK group, for example, is an FMPK group at the same RAID level as the copy-source FMPK group. The copy-source area data may be all the data in a LU formed on the basis of the copy-source FMPK group (RAID group), data stored in a portion of the area on the LU (for example, an area identified from a specified LBA), or data stored in the entire copy-source FMPK group.

In a copy process between FMPK groups, either the copy-source FMPK 21 or the copy-destination FMPK 21 is the initiator, and the copy-source area data is migrated to the copy-destination area without going through the ST-CTL 10.

The FMPK 21 constituting the initiator is the FMPK 21, which can perform the copy process without going through the ST-CTL 10, and, in addition, has received a CTL copy indication from the ST-CTL 10.

In a case where the copy-source FMPK 21 is the initiator (a case where the copy-source FMPK 21 has received a CTL copy indication), processing for writing the copy-source area data in LU units to the copy-destination area is performed from the copy-source FMPK 21 to the copy-destination FMPK 21. Alternatively, in a case where the copy-destination FMPK 21 is the initiator (a case where the copy-destination FMPK 21 has received a CTL copy indication), processing for reading the copy-source area data in LU units to the copy-destination area is performed from the copy-source FMPK 21 to the copy-destination FMPK 21. This makes it possible to perform a copy process without going through the ST-CTL 10, enabling the copy load on the ST-CTL 10 to be reduced.

As described hereinabove, a data copy process may or may not be performed between FMPK groups. For example, in a case where the copy source data has been updated, difference data between the source data and the updated data may be the target of the copy process. In a case where thin provisioning is being applied in the storage apparatus, the copy process may be performed having a virtual page as the unit.

In the following explanation, the target of a copy process related to the example, for example, is data related to a FMPK 21 for which the capacity of the data, which is the target of the copy process, is large, and, in addition, the load on the ST-CTL 10 is large in an ordinary copy process (a copy process, which goes through the ST-CTL 10).

Figures 2, 3:
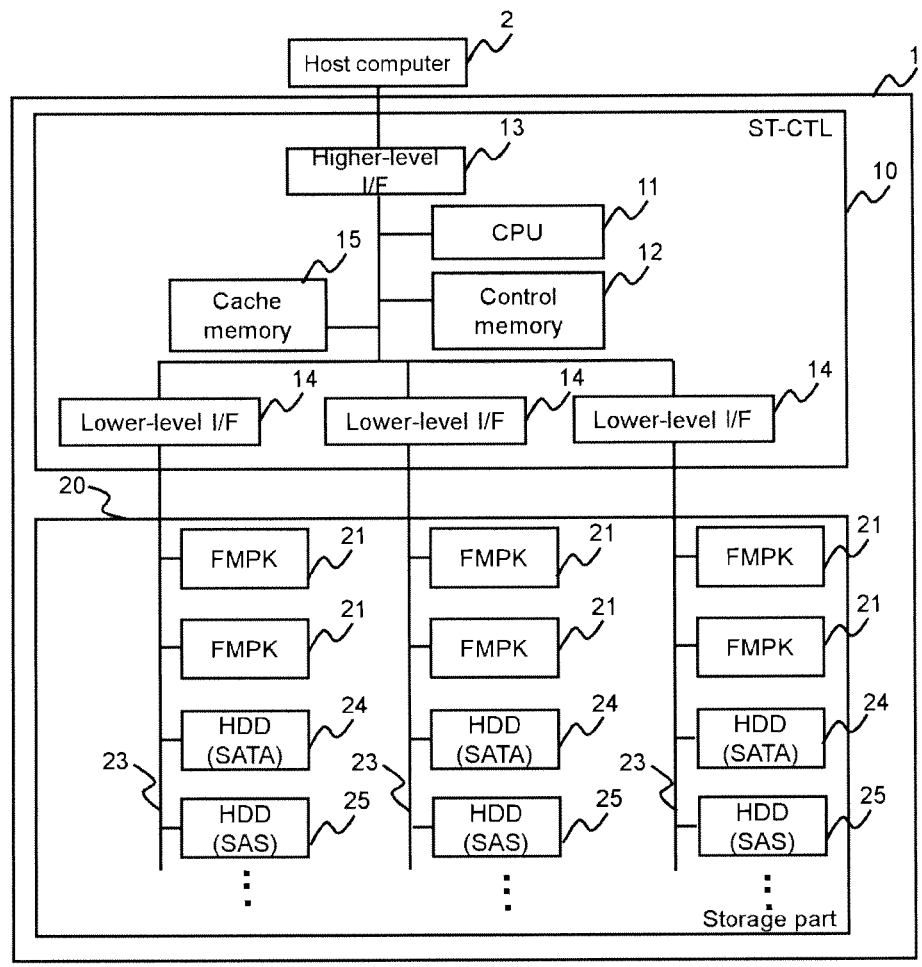
FIG. 2 is a simplified block diagram of a computer system related to the first example.
FIG. 3 shows an example of LU configuration management table 600.

FIG. 2 is a simplified block diagram of a computer system related to the first example.

The computer system comprises a storage apparatus 1 and a higher-level apparatus 2. The storage apparatus 1 is communicably coupled to the higher-level apparatus 2 via a prescribed communication network (for example, a LAN (Local Area Network)).

The higher-level apparatus 2, for example, is a host computer. In the following explanation, the higher-level apparatus 2 will be regarded as a host computer, and will be written as host computer 2. The host computer 2, for example, is an application server.

The storage apparatus 1 comprises the ST-CTL 10 and a storage part 20.

The ST-CTL 10 controls the operation of the storage apparatus 1. The ST-CTL 10 comprises a CPU (Central Processing Unit) 11, a control memory 12, a higher-level I/F (Interface) 13, one or more lower-level I/Fs (Interface) 14, and a cache memory 15.

The CPU 11 controls the entire storage apparatus 1. The CPU 11 realizes various functions in accordance with executing a program stored in the control memory 12. The control memory 12, for example, is a DRAM (Dynamic RAM) or other such volatile memory. Either all or part of the control memory 12 may be a SCM flash memory. A computer program and information required for the CPU 11 to control the storage apparatus 1 are stored in the control memory 12. For example, process management information 400, a LU (Logical Unit) configuration management table 600, a RG (RAID Group) configuration management table 700, a FMPK management table 800, and package-side copy-enabling condition information 900 are stored in the control memory 12. These tables and information will be explained further below. Furthermore, the control memory 12 comprises a cache area for temporarily storing data sent from the host computer 2, and data sent from the storage part 20. The cache memory 15, for example, temporarily stores data sent from the host computer 2, and data sent from the storage part 20.

The higher-level I/F 13 is a communication interface device for coupling the storage apparatus 1 and the host computer 2. The lower-level I/F 14 is a communication interface device for coupling the ST-CTL 10 and the storage part 20 (for example, the FMPKs 21). In FIG. 2, a single bus 23 is coupled to a single lower-level I/F 14. Multiple PDEVs (FMPKs 21) are coupled to each bus 23. Here, multiple RAID groups may be formed based on multiple of the same type of PDEVs being coupled to the same bus 23. A LU may also be formed as a logical storage unit based on the storage space of a RAID group, which has been formed.

The storage part 20 comprises multiple PDEVs. The PDEVs, for example, include a FMPK 21 and HDDs (Hard Disk Drive) 24 and 25. The HDDs, for example, are a SATA (Serial ATA)-HDD 24 and a SAS (Serial Attached SCSI)-HDD 25. In this example, a data copy (migration), which does not go through the ST-CTL 10 cache memory 15, is possible between multiple FMPKs 21 coupled via the same bus (the bus, which couples the FMPKs 21 without going through the ST-CTL 10) 23 and/or inside the same FMPK 21. Furthermore, in a case where different buses 23 are coupled together, a data copy (migration), which does not go through the ST-CTL 10 cache memory 15, is also possible between multiple FMPKs 21, which are coupled to multiple of these coupled buses 23.

Furthermore, in a copy process of this example, for example, there is a copy of the volume within the storage apparatus, movement (migration) of volume, a snapshot, etc. The "Copy of the volume", for example, shows a process for making the data stored in a PVOL and the data stored in a SVOL the same inside the storage apparatus in accordance with copying the data stored in the PVOL inside the storage apparatus to the SVOL inside the same storage apparatus (that is, duplicating the data).

The "Snap Shot", for example, shows a process for holding PVOL data at a prescribed time point (a specified snapshot acquisition time point) (for example, a process for replicating all of the data in the PVOL or difference data with the PVOL at a previous time point in either the SVOL or a different identified storage area).

The "migration", for example, shows a process for migrating data in the PVOL to the SVOL. Data does not remain in the migration source volume. That is, the data of the migration source volume is deleted in migration. Copy of data and movement of data may be performed between the same kind of storage devices, and may be performed between the different kind of storage devices. That is, copy/movement of data may be performed between FMPKs, and copy/movement of data may be performed between a FMPK and a HDD. An unit of data copy may be a volume unit or an unit of the storage area whose size is smaller than the predetermined size. The opportunity of a data copy may be the case where the ST-CTL 10 receives a copy-direction from the host computer 2 or the case where a predetermined condition is fulfilled (That is, the ST-CTL 10 may perform data copy without the copy-direction from the host computer 2). For example, a process which is performed when the predetermined condition is fulfilled, may be a process reallocate data by migrating data between real segments having different performance based on a data access status (for example, a data access frequency) in a pool in which multiple real segment groups having different access performance are intermixed, and so on.

FIG. 3 shows an example of a LU configuration management table 600.

The LU configuration management table 600 associatively stores a LU #601, a RG #602, a LU start address 603, and a LU size 604 for each LU.

The LU #601 is information for identifying a VOL. The RG #602 is information for identifying a RAID group to which each LU belongs. The LU start address 603 is information showing the start address of the logical address allocated to each LU. The LU size 604 is information showing the storage capacity of each LU. The package #605 is information showing the package (FMPK 21 and so forth) on which the LU is based.

FIG. 4 shows an example of the RG configuration management table 700.

The RG configuration management table 700 associatively stores a RG #701, a package #702, and a RAID level 703 for each RG.

The RG #701 is information (for example, identifier) for identifying a RAID group. The package #702 is information showing the identifier of the physical storage devices, which comprise each RAID group. The RAID level 703 is information showing the RAID level of each RG #701.

FIG. 5 shows an example of the FMPK management table 800.

The FMPK management table 800 associatively stores a package #801, a group #802, and a PDEV type 803 for each package.

The package #801 shows information for identifying a package (PDEV). The group #802 is information showing the bus 23 to which the PDEVs are coupled. In this example, data can be copied between FMPK groups coupled to the same bus 23 without going through the ST-CTL 10. The PDEV type 803 is information showing the type of each PDEV. The fact that the PDEV type 803 is "FMPK" here shows that the package is a FMPK 21, which has a copy function (hereinafter, direct copy function) for copying data without going through the cache memory 15 of the ST-CTL 10. A case where the PDEV type 803 is not "FMPK" (for example, "SSD") shows that the package is a PDEV, which does not have the copy function for copying data without going through the cache memory 15 of the ST-CTL 10.

FIG. 6 shows an example of package-side copy-enabling condition information 900.

The package-side copy-enabling condition information 900 is also included in the copy processing program in this example, and is information that the ST-CTL 10 (CPU 11) references when executing a copy process. The information 900 is for managing a condition for judging the advisability of a copy process for a package related to a certain copy process, and the advisability of a copy process, which corresponds to the value of this condition. The information 900 comprises a group condition 901, a determination 902 (Yes/No) with respect to the group condition 901, a function support condition 903, a determination 904 (Yes/No) with respect to the function support condition 903, and a copy process advisability 905.

The group condition 901 shows a condition for determining whether the copy source/copy destination packages, which constitute the target of the copy process, are located in the same group. Specifically, the group condition 901 is a condition for determining whether the group #802 in the FMPK management table 800 corresponding to the copy source and copy destination packages is the same. In a case where the group #802 is the same, the determination 902 for the group condition 901 becomes "Yes". That is, the ST-CTL 10 judges whether or not the copy source FMPK 21 and the copy destination FMPK 21 are connected with the same bus. In a case where the group #802 is not the same, the determination 902 for the group condition 901 becomes "No".

The function support condition 903 shows a condition for determining whether the copy-source and/or copy-destination packages, which are the targets of the copy process, are FMPK 21 comprising a direct copy function. Specifically, the condition 903 is for determining whether the PDEV type 803 in the FMPK management table 800 corresponding to the copy-source and/or copy-destination package is "FMPK". In a case where the PDEV type 803 of the copy-source and/or copy-destination package is "FMPK", the determination 904 for the condition 903 is "Yes". In a case where the PDEV type 803 of the copy-source and/or copy-destination package is not "FMPK", the determination 904 for the condition 903 is "No".

The copy process advisability 905 shows the result of copy process advisability based on the determination 902 and the determination 904. The advisability 905 shows whether or not a copy process is possible inside the same FMPK 21 and/or between FMPK groups (also includes between packages here). Specifically, in a case where the determination 902 and the determination 904 are both "Yes", the copy process advisability 905 is "Yes". In accordance with this, a copy process is possible inside the same FMPK 21 and/or between FMPK groups (between packages). In a case other than this, that is, in a case where the determination 902 and the determination 904 are not both "Yes", the copy process advisability 905 is "No". In accordance with this, a copy process is not possible inside the same FMPK 21 and/or between FMPK groups (between packages).

Figure 7:
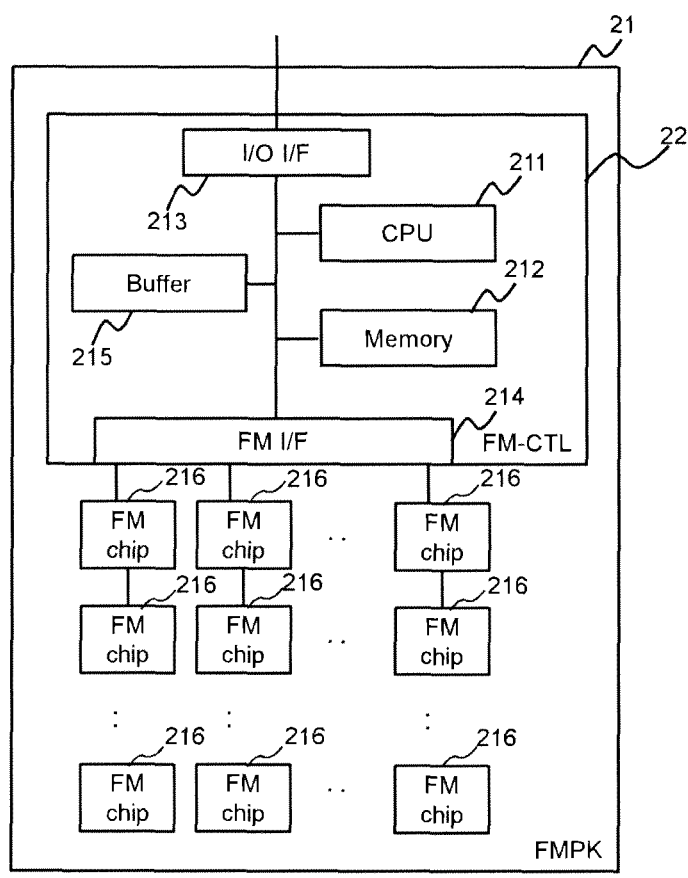
FIG. 7 shows an example of the configuration of a FMPK 21 related to the first example.

FIG. 7 shows an example of the configuration of a FMPK 21 related to the first example.

The FMPK 21 comprises a FM-CTL 22 and multiple FM chips 216.

The FM-CTL 22 controls the operation of the FMPK 21 and controls write/read of the data to/from multiple FM chips. The FM-CTL 22 comprises a CPU 211, a memory 212, an I/O (Input/Output) I/F (Interface) 213, a FM I/F 214, and a buffer 215. The CPU 211, the memory 212, the I/O I/F 213, and the buffer 215, for example, are coupled to the FM I/F 214 using a dedicated interconnect bus such as a PCI (Peripheral Component Interconnect). The FM-CTL 22 may comprise a DMA (Direct Memory Access) circuit, a bit inversion circuit, and an ECC (Error Correcting Code) circuit.

The CPU 211 controls the entire FMPK 21. The memory 212, for example, is a volatile memory such as a DRAM (Dynamic RAM). Furthermore, either all or part of the memory 212 may be used as a SCM (Storage Class Memory) flash memory. The memory 212 stores a computer program and information required for the CPU 211 to control the FMPK 21. Management information, which includes a logical address managed by the FMPK 21, is stored in the memory 212. A physical page status management table 1200, a logical-physical translation table 1500, read process information 1600, and write process information 1800 are stored in the memory 212. These tables and information will be explained further below. The memory 212 also includes a cache area for temporarily storing data sent from the ST-CTL 10 and data sent from the FM chip 216 (a NAND FM chip and/or a SCM FM chip). In the following explanation, this cache area may be described as the cache memory 212.

The I/O I/F 213 is a communication interface for coupling the FMPK 21 with the ST-CTL 10. The FM I/F 214 is a communication interface for coupling the FM-CTL 22 with multiple FM chips 216.

The FM chip 216 is a NAND-type FM chip and/or a SCM (Storage Class Memory)-type FM chip. For the NAND-type FM chip, a data erase is performed in units of blocks, and access to data is performed in units of pages. The FM chip 216 may be another type of FM chip (for example a NOR type) instead of the NAND type. Another nonvolatile semiconductor memory medium, for example, a phase-change memory chip may be used instead of the FM chip.

Figures 8, 9:
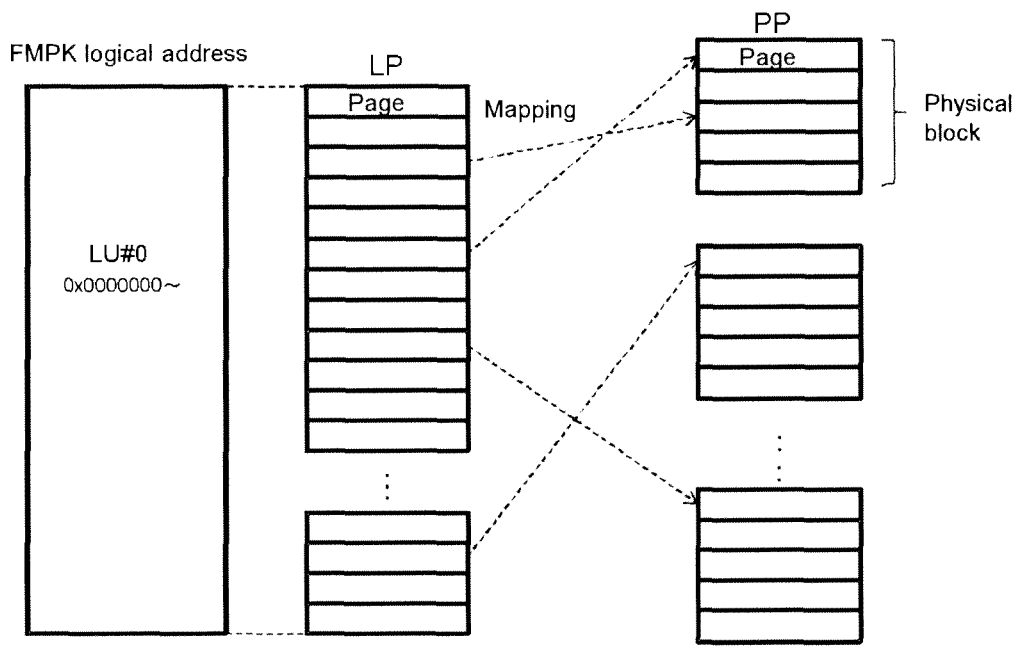
FIG. 8 shows an outline of an association between a logical page and a physical page managed by the FMPK 21.
FIG. 9 shows an example of a physical page status management table 1200.

FIG. 8 shows an outline of an association between a logical page and a physical page managed by the FMPK 21.

The FM-CTL 22 provides the ST-CTL 10 with a logical storage space. The logic storage space is accessed from the ST-CTL 10 per logic address (for example, logical block address ((LBA)). The FM-CTL 22 manages the logical storage space as multiple logical pages. Each logical pate is a logical address range of the predetermined size. One physical page is associated with each logical page. Furthermore, although not shown in FIG. 8, multiple physical pages may be associated with one logical page.

An aggregate of multiple physical pages (for example, 64 pages worth of physical pages) forms one physical block. The physical pages show the areas into which a physical storage area based on an FM chip 216 has been partitioned. In a case where the FM chip 216 is a NAND-type flash memory chip, a data erase is performed in units of physical blocks, and a data access (read/write) is performed in units of physical pages.

FIG. 9 shows an example of the physical page status management table 1200.

The physical page status management table 1200 associatively stores a physical page number 1201 and a physical page status 1202 for each physical page.

The physical page number 1201 is information for identifying a physical page. The physical page status 1202 is information showing the status of the physical page. The physical page status includes "valid", "free", and "invalid". A physical page status 1202 of "valid" shows that data is stored in the physical page and that this physical page is associated with an logical page. A physical page status 1202 of "free" shows that data is not stored in the physical page. A physical page status 1202 of "invalid" shows that data is stored in the physical page, but that the physical page is not associated with any of the logical pages. In addition, because the ST-CTL 10 is supposed to access the FMPK 21 by specifying the logical address, the ST-CTL 10 can't refer to the data in the physical page (the physical page state 1202 is "invalidity") which is not allocated to a logical page which the specified logical address belongs to.

The ST-CTL 10 is not able to reference data in a physical page for which the physical page status 1202 is "invalid".

FIG. 10 shows a logical-physical translation table 1500 managed by the FMPK 21, and transitions in the status of the logical-physical translation table 1500 during a copy process inside the same FMPK 21.

The logical-physical translation table 1500 associatively stores a logical page #1501, a physical page #1 1502, a physical page #2 1503, and a copy status 1504 for each logical page.

The logical page #1501 is information for identifying a logical page. The physical page #1 1502 is information for identifying a physical page associated with the logical page. The physical page #2 1503 is information for identifying a physical page associated with the logical page. The copy status 1504 is information showing whether or not data is being copied from the physical page (hereinafter, copy-source physical page) associated with the copy-source logical page to the physical page (hereinafter, copy-destination physical page) associated with the copy-destination logical page. The copy status 1504 of "copy in progress" shows that data is being copied from the copy-source physical page to the copy-destination physical page (the copy process has not ended). A copy status 1504 of "–" shows that data is not being copied.

FIG. 11 shows an example of the read process information 1600.

The read process information 1600 is included in the copy processing program in this example, and is information, which the target FM-CTL 22 (CPU 211) references when executing a copy process. The information 1600 is information showing a FM-CTL 22-executed read process corresponding to a copy status. The read process information 1600 associatively stores a copy status 1601, a copy source page read process 1602, and a copy destination page read process 1603 for each copy status.

The copy status 1601 is information showing whether or not data is being copied from the copy-source logical page to the copy-destination logical page. A copy status 1601 of "copy in progress" shows that a data copy is in progress, that is, that the data copy is not complete. A copy status 1601 of "copy complete" shows that the data copy has been completed.

The copy source page read process 1602 shows a process to be executed by the FM-CTL 22 in a case where a read command for the copy-source logical page has been sent. Specifically, in the case where the copy status 1601 is "copy in progress", the read process 1602 shows that the FM-CTL 22 reads from the copy-source physical page. That is, the FM-CTL 22 references the logical-physical translation table 1500 and reads data, which conforms to the read command, from the copy-source physical page associated with the copy-source logical page. Furthermore, in the case where the copy status 1601 is "copy complete", the read process 1602 shows that the FM-CTL 22 reads from the copy-source physical page. That is, the FM-CTL 22 reads data, which conforms to the read command, from the copy-source physical page associated with the copy-source logical page.

The copy destination page read process 1603 shows a process to be executed by the FM-CTL 22 in a case where a read command for the copy-destination logical page has been received. Specifically, in the case where the copy status 1601 is "copy in progress", the read process 1603 shows that the FM-CTL 22 reads from the copy-source physical page. Therefore, the FM-CTL 22 references the logical-physical translation table 1500 and reads data, which conforms to the read command, from the copy-source physical page associated with the copy-destination logical page. Thus, the data is read from the copy-source physical page because the data copy from the copy-source physical page to the copy-destination physical page is not complete. Furthermore, in the case where the copy status 1601 is "copy complete", the read process 1603 shows that the FM-CTL 22 reads from the copy-destination physical page. Therefore, the FM-CTL 22 references the logical-physical translation table 1500 and reads data, which conforms to the read command, from the copy-destination physical page associated with the copy-destination logical page. Thus, the data is read from the copy-destination physical page because the data copy to the copy-destination physical page is complete.

FIG. 12 shows an example of the write process information 1800.

The write process information 1800 is also included in the copy processing program in this example, and is information, which the target FM-CTL 22 (CPU 211) references when executing a copy process. The information 1800 shows a FM-CTL 22-executed write process corresponding to a copy status. The information 1800 associatively stores a copy status 1801, a copy source page write process 1802, and a copy destination page write process 1803 for each copy status.

The copy status 1801 is information showing whether or not a data copy from the copy-source logical page to the copy-destination logical page is being processed. A copy status 1801 of "copy in progress" shows that a data copy process is in progress. A copy status 1801 of "copy complete" shows that the data copy has been completed.

The copy source page write process 1802 shows a process to be executed by the FM-CTL 22 in a case where a write command for the copy-source logical page has been sent. Specifically, in the case where the copy status 1801 is "copy in progress", the write process 1802 shows that the FM-CTL 22 reserves a new physical page, and writes data, which conforms to the write command, to the reserved physical page. Therefore, the FM-CTL 22 associates the physical page to which the data conforming to the write command is written with the copy-source logical page, and cancels the association between the copy-source physical page and the copy-source logical page. Furthermore, the FM-CTL 22 cancels the association between the copy-destination logical page and the copy destination-physical page. In accordance with this, the FM-CTL 22 changes the physical page status 1202 of the copy-destination physical page in the physical page status management table 1200 to "invalid". In accordance with this processing, the physical page to which the data conforming to the write command is written is associated with the copy-source logical page, and the copy-destination logical page and copy-source physical page are associated. In the case where the copy status 1801 is "copy complete", the write process 1802 shows that the FM-CTL 22 reserves a new physical page, and writes data, which conforms to the write command, to the reserved physical page. Therefore, the FM-CTL 22 associates the physical page to which the data conforming to the write command is written with the copy-source logical page. In accordance with this, the FM-CTL 22 changes the physical page status 1202 of the copy-destination physical page in the physical page status management table 1200 to "invalid".

The copy destination page write process 1803 shows a process to be executed by the FM-CTL 22 in a case where a write command for the copy-destination logical page has been sent. Specifically, in the case where the copy status 1801 is "copy in progress", the write process 1803 shows that the FM-CTL 22 reserves a new physical page, and writes data, which conforms to the write command, to the reserved physical page. Therefore, the FM-CTL 22 associates the physical page to which the data conforming to the write command is written with the copy-destination logical page. In accordance with this, the FM-CTL 22 changes the physical page status 1202 of the copy-destination physical page in the physical page status management table 1200 to "invalid". In the case where the copy status 1801 is "copy complete", the write process 1803 shows that the FM-CTL 22 reserves a new physical page, and writes data, which conforms to the write command, to the reserved physical page. Therefore, the FM-CTL 22 associates the physical page to which the data conforming to the write command is written with the copy-destination logical page. In accordance with this, the FM-CTL 22 changes the physical page status 1202 of the copy-destination physical page in the physical page status management table 1200 to "invalid".

Next, the processing of a computer system related to the first example will be explained.

Figure 13:
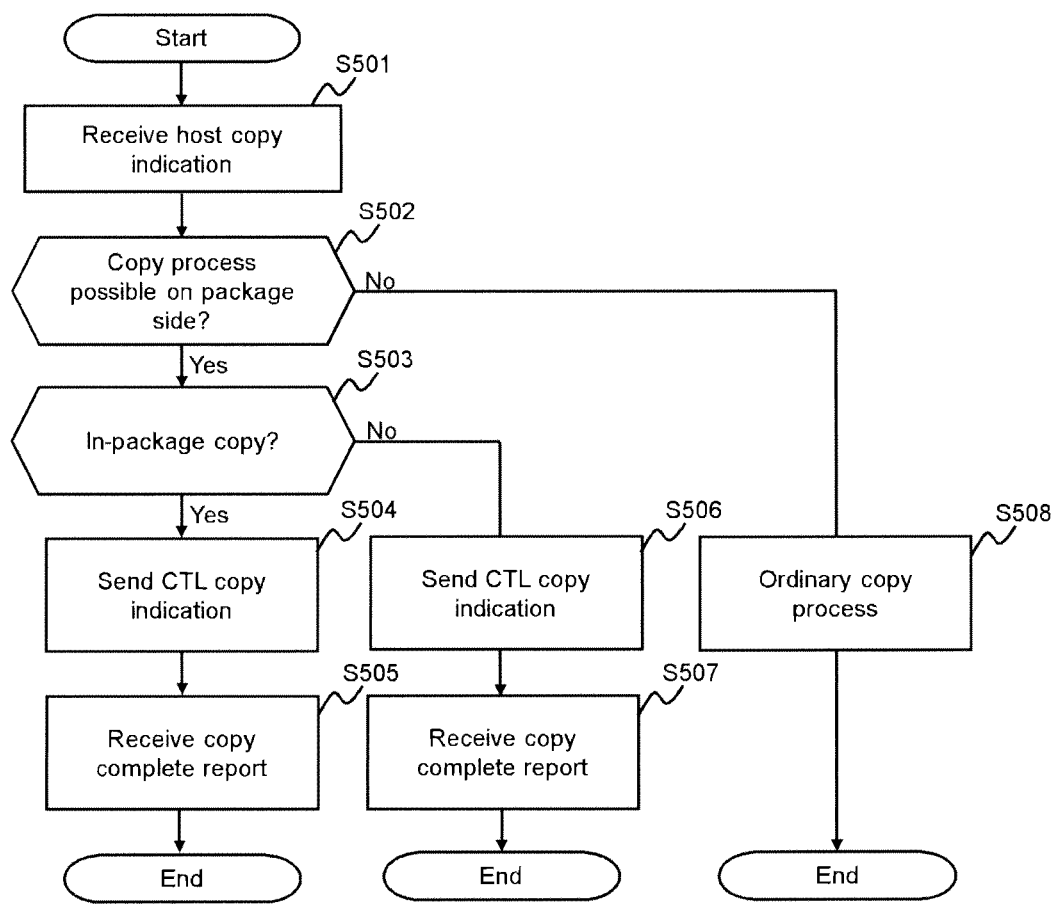
FIG. 13 shows an example of the flow of a data copy process in accordance with a ST-CTL 10.

FIG. 13 shows an example of the flow of a data copy process by the ST-CTL 10.

ST-CTL 10 receives a host copy indication from a host computer 2 (S501). The ST-CTL 10 receives from the host computer 2 a host copy indication, and performs the processing of (1) and (2).

(1) The ST-CTL 10 uses the LU configuration management table 600 to identify the RG # of the copy-source RG corresponding to the LU # in the information denoting the host-specified copy-source area, and, in addition, to identify the RG # of the copy-destination RG corresponding to the LU # in the information denoting the host-specified copy-destination area.

(2) The ST-CTL 10 uses the RG # of the copy-source RG and the RG # of the copy-destination RG to identify multiple packages (copy-source packages) comprising the copy-source RG and multiple packages (copy-destination packages) comprising the copy-destination RG. In this example, it is supposed that the RAID configuration of the copy-source RG (for example, the RAID level, number of devices and attribute (for example, 3D+1P)) is the same as the RAID configuration of the copy-destination RG, and a combination of a copy-source package and a copy-destination package (a package pair) is unconditionally defined.

The ST-CTL 10 determines whether or not a data copy process from a certain area to another area is possible on the package side, that is, without going through the ST-CTL 10 (S502). Specifically, the ST-CTL 10 determines whether or not the copy process advisability 905 of the package-side copy-enabling condition information 900 is "Yes" for the FMPK 21 comprising the copy-source area and/or the copy-destination area specified by the host copy indication from the host computer 2 (That is, the ST-CTL 10 determines whether or not the FMPK 21 comprising the copy-source area and/or the copy-destination area comprises the direct copy function). According to a determination using the package-side copy-enabling condition information 900, it is determined whether or not packages comprising the copy-source area and/or the copy-destination area specified by the host copy indication from the host computer 2 are the same group, that is, are communicably coupled without going through the ST-CTL 10, and whether or not either the copy-source or copy-destination package is a FMPK 21 comprising the direct copy function. This makes it possible to appropriately determine whether or not a data copy from a certain area to another area in the FMPK 21 is possible without going through the ST-CTL 10.

In a case where a copy from a certain area to another area is possible without going through the ST-CTL 10 is not possible (S502: No), the ST-CTL 10 performs a normal copy process (S508). Here, in a normal copy process, the ST-CTL 10 reads the copy-source area data from the copy-source package, stores the data, which has been read, in the cache memory 15, and writes the copy-source area data, which is stored in the cache memory 15, to the copy-destination package. Therefore, a copy can be performed without a hitch even in a case where a data copy from a certain area to another area is not possible without going through the ST-CTL 10.

In a case where the copy from a certain area to another area without going through the ST-CTL 10 is possible (S502: Yes), the ST-CTL 10 determines whether or not the copy-source area and the copy-destination area are inside the same package (S503). Specifically, the ST-CTL 10, based on the LU configuration management table 600, determines whether or not the copy-source area and the copy-destination area, which are being specified by the host copy indication from the host computer 2, are areas of the same package.

In a case where the copy-source area and the copy-destination area are areas inside the same package (S503: Yes), the ST-CTL 10 sends a CTL copy indication to the package including the copy-source area and the copy-destination area (specifically, the FMPK 21) (S504). This CTL copy indication at the least includes a copy-source logical address, a data amount for the target data, and a copy-destination logical address. That is, a CTL copy indication may be information which makes it possible to specify the logical address range for copy. For example, the CTL copy indication may include the beginning value (start address) and the last value (end address) of the logic address range for copy, or the beginning value of the logic address range for copy and data quantity (information corresponding to the length of the logic address). Moreover, the CTL copy indication may also include the identifier of the copy source FMPK 21 and the identifier of the copy destination FMPK 21.

This makes it possible to appropriately send the CTL copy indication to the FMPK 21 in which a data copy from a certain area to another area is possible without going through the ST-CTL 10.

Thereafter, the ST-CTL 10 receives a copy complete report from the FMPK 21, which received the CTL copy indication (S505). Furthermore, the FMPK 21, which received the CTL copy indication, may send a copy complete report to the ST-CTL 10 after the copy has been completed, or may send the copy complete report to the ST-CTL 10 after the CTL copy indication has been received.

Alternatively, in a case where the copy-source area and the copy-destination area are not areas inside the same package (S503: No), the ST-CTL 10 sends the CTL copy indication to a any FMPK 21 that comprises the direct copy function (S506). Specifically, the ST-CTL 10 identifies, from the LU #601 in the LU configuration management table 600, the RG #602 of the RG, which forms the LU that includes the copy-source area, and the RG #602 of the RG, which forms the LU that includes the copy-destination area. Then, the ST-CTL 10 identifies, from the identified RG #602, multiple package #s (FMPKs 21) comprising the RG of the copy-source area and copy-destination area. The ST-CTL 10 determines whether the package identified in accordance with the identified package # comprises the direct copy function, and sends the CTL copy indication to the FMPK 21 that comprises the direct copy function. The processing of S506 will be explained in detail further below.

This makes it possible to appropriately send the copy indication to a FMPK 21 in which a data copy from a certain area to another area is possible without going through the ST-CTL 10. In a case where the packages constituting the copy source and the copy destination both comprise the direct copy function here, the ST-CTL 10, in accordance with a prescribed rule, selects either package (FMPK 21), and sends the CTL copy indication to the selected FMPK 21. The CTL copy indication also includes an indication for performing a copy process by making the FMPK 21, which received the CTL copy indication, the initiator.

In a case where only one of the packages comprises the direct copy function, the ST-CTL 10 sends the CTL copy indication to the package (the FMPK 21) that comprises the direct copy function. Thereafter, the ST-CTL 10 receives a copy complete report from the FMPK 21, to which the CTL copy indication was sent, showing that the copy has been completed (S507).

—Processing of S506—

In S506, specifically, the ST-CTL 10 makes a determination as to whether the copy-source FMPK 21 and the copy-destination FMPK 21 comprise the direct copy function. Processing such as that described in (1) through (3) below is performed on the basis of the result of this determination.

(1) In a case where only the copy-source FMPK 21 comprises the direct copy function (or a case in which the copy-source FMPK 21 and the copy-destination FMPK 21 both comprise the direct copy function), the ST-CTL 10 can send the CTL copy indication to the copy-source FMPK 21. The copy-source FMPK 21 receives the CTL copy indication, and sends a write indication (a write destination specifying a CTL-specified copy-destination area) for writing data inside a CTL-specified copy-source area to the copy-destination FMPK 21 having the package # associated with the CTL copy indication. The copy-destination FMPK 21 receives the write indication, and writes the data targeted by the write indication (the copy-target data) to an area specified by the write indication. At this point, the copy-destination FMPK 21 reports the completion of the write to the copy-source FMPK 21, and the copy-source FMPK 21, upon receiving the report, may send the copy-complete report to the ST-CTL 10 as a response to the CTL copy indication.

(2) In a case where at least the copy-destination FMPK 21 of a copy-source FMPK 21 and a copy-destination FMPK 21 comprises the direct copy function (or a case in which only the copy-destination FMPK 21 comprises the direct copy function), the ST-CTL 10 can send a CTL copy indication to the copy-destination FMPK 21. The copy-destination FMPK 21 receives the CTL copy indication and sends a read indication specifying a CTL-specified copy-source area to the copy-source FMPK 21 having the package # associated with the CTL copy indication. The copy-source FMPK 21 receives the read indication, reads the copy-target data from the area specified by the read command, and sends the data, which has been read, to the copy-destination FMPK 21. The copy-destination FMPK 21 writes the data from the copy-source FMPK 21 to a CTL-specified copy-destination area. Thereafter, the copy-destination FMPK 21 may send a copy-complete report to the ST-CTL 10 as a response to the CTL copy indication.

(3) In a case where neither the copy-source FMPK 21 nor the copy-destination FMPK 21 comprise the direct copy function, the ST-CTL 10 reads data from a host-specified copy-source area and writes the data to a host-specified copy-destination area. That is, the data is copied from the host-specified copy-source area to the host-specified copy-destination area by way of the ST-CTL 10.

In a case where both the copy-source and the copy-destination FMPKs 21 comprise the direct copy function, it is preferable that the CTL copy indication be sent to the copy-destination FMPK 21. This is because the process whereby the copy-destination FMPK 21 reads the copy-source area data (the copy-target data) from the copy-source FMPK 21 (when the copy-destination FMPK 21 is the initiator) places less of a copy processing burden on the FMPKs 21 than the processing whereby the copy-source FMPK 21 writes the copy-source area data (the copy-target data) to the copy-destination FMPK 21 (when the copy-source FMPK 21 is the initiator).

Figure 14:
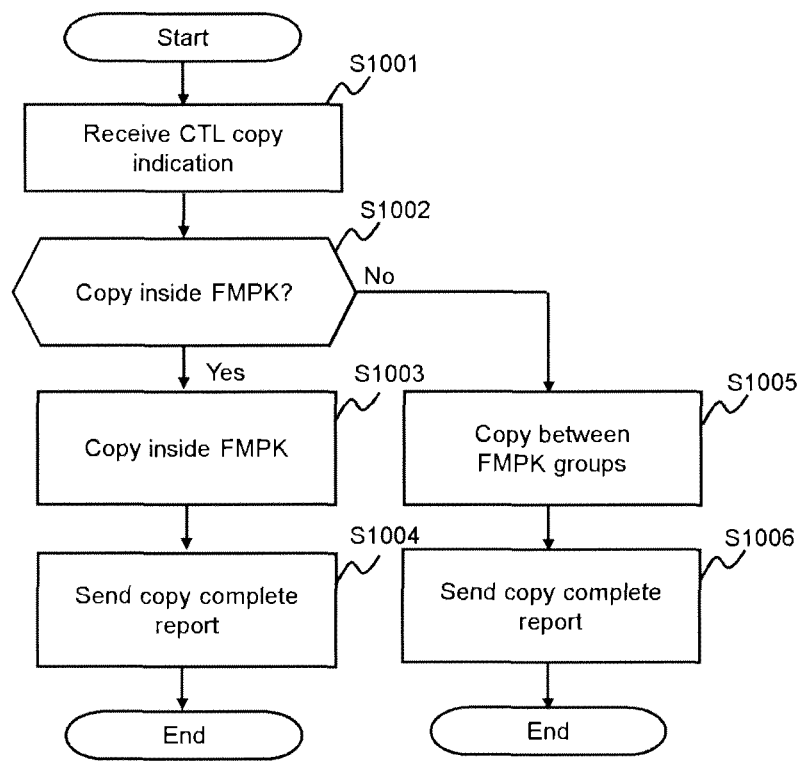
FIG. 14 shows an example of the flow of a data copy process by the FMPK 21.

FIG. 14 shows an example of the flow of a data copy process by the FMPK 21.

The FM-CTL 22 receives from the ST-CTL 10 a CTL copy indication for copying data inside an FMPK 21 from an identified area to another area (S1001). The CTL copy indication includes FMPK 21-related information shown by the LU and logical address of the copy source and the LU and logical address of the copy destination. When a data copy by the FMPK 21 can be performed inside the same FMPK 21 here, a data copy can also be performed between FMPK groups. In a case where the data is to be copied inside the same FMPK 21, the ST-CTL 10 sends the CTL copy indication to this FMPK 21. In a case where the data is to be copied between FMPK groups, the ST-CTL 10 sends the CTL copy indication to either the copy-source FMPK 21 or the copy-destination FMPK 21.

Next, the FM-CTL 22 determines whether or not the data copy is a copy process to be performed by the same FMPK 21 (S1002). The FM-CTL 22 determines whether the copy indication sent from the ST-CTL 10 is for a copy inside the same FMPK 21, or for a copy between FMPK groups.

In a case where it is a copy by the same FMPK 21 (S1002: Yes), the FM-CTL 22 performs the copy process inside the FMPK 21 (refer to FIG. 16) (S1003). Thereafter, the FM-CTL 22 sends a copy complete report to the ST-CTL 10 (S1004). Here, the FM-CTL 22 may send the copy complete report to the ST-CTL 10 after the copy inside the FMPK 21 has been completed, or may send the copy complete report to the ST-CTL 10 after having received the CTL copy indication.

Alternatively, in a case where it is not a copy by the same FMPK 21 (S1002: No), the FM-CTL 22 performs a copy process between FMPK groups (refer to FIGS. 21 and 28) (S1005).

Thereafter, each FM-CTL 22 sends a copy complete report to the ST-CTL 10 (S1006). Here, each FM-CTL 22 sends the copy complete report to the ST-CTL 10 after the copy process of S 1005 has been completed rather than after having received the CTL copy indication. This, for example, is in order to avoid a situation in which read-target data does not exist in each copy-destination FMPK 21 in a case where a read command is sent to each copy-destination FMPK 21 during a copy process.

Figure 15:
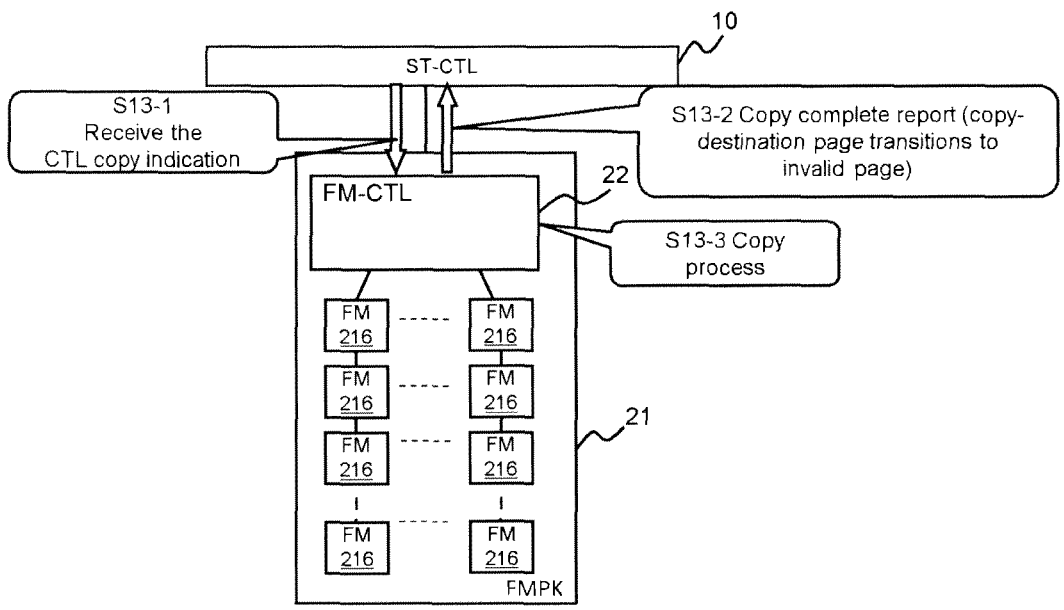
FIG. 15 shows an overview of a copy process inside the same FMPK 21.

FIG. 15 shows an overview of a copy process inside the same FMPK 21. The FM chip 216 is abbreviated as FM 216 in FIG. 15 or the like.

The FM-CTL 22 of the FMPK 21 receives a CTL copy indication sent from the ST-CTL 10 (S13-1: S501 of FIG. 13). Upon receiving the CTL copy indication, the FM-CTL 22 sends a copy complete report to the ST-CTL 10 (S13-2). In a case where the CTL copy indication is for a copy process inside the same FMPK 21, the FM-CTL 22 performs the copy inside the same FMPK 21 (S13-3).

Figure 16:
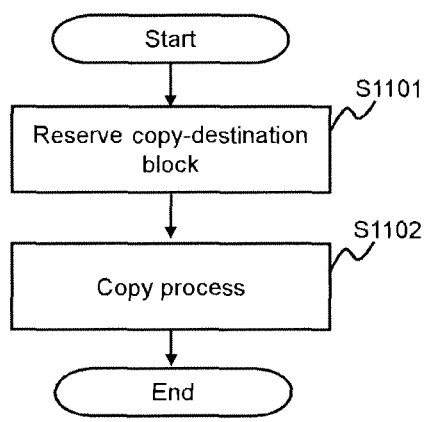
FIG. 16 shows the flow of the copy process inside the same FMPK 21.

FIG. 16 shows the flow of a copy process inside the same FMPK 21.

The copy process inside the same FMPK 21 shown in FIG. 16 is processing corresponding to S 1003 of FIG. 14.

The FM-CTL 22 reserves a copy-destination physical page for copying the target data (S1101). The FM-CTL 22 need not actually reserve a physical page here, but rather may check that the usable physical capacity inside the FMPK 21 is equal to or larger than the data amount of the target data. The FM-CTL 22 copies the data from the copy-source physical page to the reserved physical page (S1102).

The specific processing by the FM-CTL 22 in this copy process inside the same FMPK 21 here will be explained below. Furthermore, before this processing, the FM-CTL 22 receives a CTL copy indication from the ST-CTL 10 for copying data from a logical address of the copy-source area (hereinafter, copy-source logical page) to a logical address of the copy-destination area (copy-destination logical page). In a case where either a read or write to either the copy-source logical page or the copy-destination logical page occurs before the copy process is complete, a process, which differs in part with the following process, will be performed. The processing in a case where either a read or a write occurs before the copy process is complete will be explained further below.

(*) The FM-CTL 22 reserves a free physical page (second physical page) for copying data stored in a physical page (first physical page) associated with the copy-source logical page.

(*) The FM-CTL 22 associates the second physical page with the copy-source logical page. In accordance with this, the first physical page and the second physical page are associated with the copy-source logical page.

(*) The FM-CTL 22 associates the first physical page and the second physical page with the copy-destination logical page. In accordance with this, the first physical page and the second physical page are associated with the copy-destination logical page.

(*) The FM-CTL 22 copies data from the first physical page to the second physical page.

(*) The FM-CTL 22, after copying the data from the first physical page to the second physical page, cancels the association between the copy-source logical page and the second physical page. In accordance with this, only the first physical page is associated with the copy-source logical page.

(*) Further, the FM-CTL 22, after copying the data from the first physical page to the second physical page, cancels the association between the copy-destination logical page and the first physical page. In accordance with this, only the second physical page is associated with the copy-destination logical page.

Transitions in the status of the logical-physical translation table 1500 in a copy process inside the same FMPK 21 will be explained here by referring to FIG. 10.

—S15-1—

S15-1 shows the status of the logical-physical translation table 1500 prior to executing the copy process, that is, at the time point when a data copy has yet to be performed from the copy-source physical page to the copy-destination physical page. In this state, the physical page "300" in the physical page #1 1502 is associated with the logical page "1", which is the copy source, in the logical page #1501. Furthermore, the physical page "500" in the physical page #1 1502 is associated with the logical page "100", which is the copy destination, in the logical page #1501.

—S15-2—

S15-2 shows the status of the logical-physical translation table 1500 at the time point when data is being migrated from the copy-source physical page to the copy-destination physical page. After the time point of S15-1, the FM-CTL 22 reserves the unused physical page "800" in physical page #1502 for copying the data stored in "physical page 300" in the physical page #1 1502 associated with the logical page "1", which is the copy source, in the logical page #1501, and stores this physical page # in physical page #2 1503, which corresponds to the logical page "1" in the logical page #1501. In accordance with this, the physical page "300" in the physical page #1 1502 and the physical page "800" in the physical page #2 1503 are associated with logical page "1" in the logical page #1501.

The FM-CTL 22 also stores the physical page # "800" in the physical page #1 1502, which corresponds to the logical page "100", which is the copy destination, in the logical page #1501, and, in addition, stores the physical page # "300" in the physical page #2 1503. In accordance with this, the physical pages "800" in the physical page #1 1502 and "300" in the physical page #2 1503 are also associated with the logical page "100" in the logical page #1501 the same as the logical page "1" in the logical page #1501.

The reason for associating two physical pages with the copy-source logical page and the copy-destination logical page like this is to appropriately deal with a case in which a read and/or a write occurs with respect to the copy-source logical page and/or the copy-destination logical page during a copy inside the same FMPK 21. This will be explained in detail further below.

After associating two physical pages with the copy-source logical page and the copy-destination logical page like this, the FM-CTL 22 starts the processing for a data copy from the copy-source physical page to the copy-destination physical page. In a case where this copy has been started, the FM-CTL 22 stores "copy in progress" in the copy status 1504 corresponding to the logical page #1501 "1" and the logical page #1501 "100", which are the copy-source logical page and the copy-destination logical page of the copy process. As a result of this, the logical-physical translation table 1500 transitions to the status shown in S15-2 of FIG. 10.

—S15-3—

S15-3 shows the status of the logical-physical translation table 1500 in a state in which the data copy from the copy-source physical page to the copy-destination physical page has ended. The FM-CTL 22, in a case where the data copy from the copy-source physical page to the copy-destination physical page has ended, cancels the association between the logical page "1", which is the copy source, in the logical page #1501, and the physical page "800" in the physical page #2 1503. In accordance with this, as shown in S15-3, the logical-physical translation table 1500 transitions to a state in which only the "300" in the physical page #1 1502 is associated with the logical page "1" in the logical page #1501. The FM-CTL 22 also cancels the association between the logical page "100", which is the copy destination, in the logical page #1501, and the physical page "300" in the physical page #2 1503. In accordance with this, as shown in S 15-3, the logical-physical translation table 1500 transitions to a state in which only the "800" in the physical page #1 1502 is associated with the logical page "100" in the logical page #1501.

Next, the processing in a case where either a read or a write occur with respect to the FMPK 21 will be explained.

Figure 17:
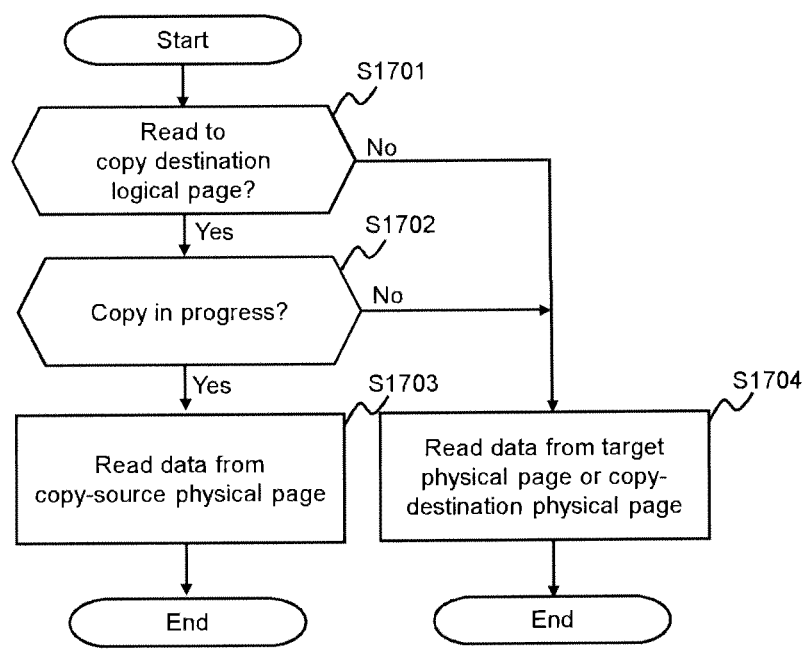
FIG. 17 shows the flow of a read process in the FMPK 21.

FIG. 17 shows the flow of a read process in the FMPK 21.

This read process is executed in a case where the FM-CTL 22 of the FMPK 21 has received a read command (read request) from the ST-CTL 10.

The FM-CTL 22 determines whether or not the read command received from the ST-CTL 10 has the copy-destination logical page as a target (S1701). As a result of this, in a case where it is a read with respect to the copy-destination logical page (S1701: Yes), the FM-CTL 22 determines whether or not the data of the copy-destination logical page is being copied (S1702). In S1701 and S1702 here, specifically, the FM-CTL 22 makes a determination in accordance with checking whether or not the copy status 1504 of the logical-physical translation table 1500 is "copy in progress". That is, in a case where the copy status 1504 corresponding to the logical page targeted by the read command is "copy in progress" in the logical-physical translation table 1500, the FM-CTL 22 is able to determine that the read command has the copy-destination logical page as the target, and, in addition, that a data copy to the copy-destination logical page is in progress.

In a case where a copy is in progress (S1702: Yes), the FM-CTL 22 executes a process, which has been identified based on the read process information 1600, that is, a process for reading the read-target data from the copy-source physical page associated with the copy-destination logical page (S1703). This makes it possible to appropriately read data from the copy-destination logical page even though a copy is in progress.

Alternatively, in a case where it is not a read with respect to the copy-destination logical page (S1701: No), the FM-CTL 22 references the logical-physical translation table 1500, and reads the data from the physical page corresponding to the read-target logical page (S1704). For example, in a case where it is a read with respect to the copy-source logical page, the FM-CTL 22 executes a process for reading the read-target data from the copy-source physical page associated with the copy-source logical page. This makes it possible to appropriately read the data from the copy-source logical page even though a copy is in progress. Furthermore, in a case where a copy is not in progress (S1702: No), the FM-CTL 22 executes a process, which is identified based on the read process information 1600, that is, a process for reading the data from the copy-destination physical page associated with the copy-destination logical page by referring to the logical-physical translation table 1500 (S1704).

Figure 18:
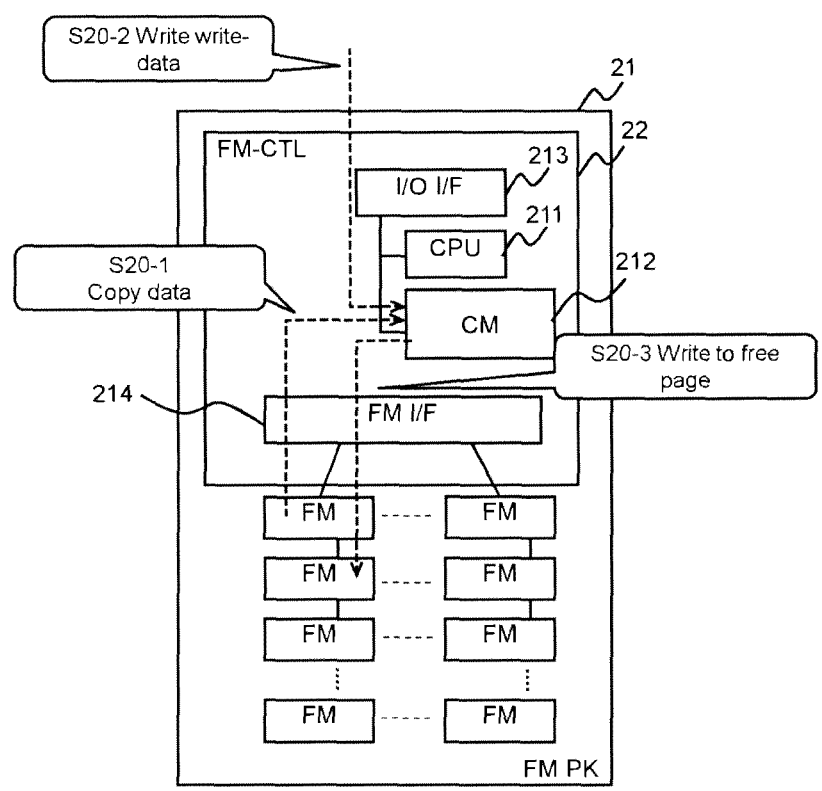
FIG. 18 shows an overview of a write process in the FMPK 21.

FIG. 18 shows an overview of a write process in the FMPK 21.

The FM-CTL 22, upon receiving a write command from the ST-CTL 10 for writing data to an identified area, reads the data from the identified area through the FM I/F 214, and stores the data, which has been read, in the cache memory 212 (S20-1). The FM-CTL 22 overwrites the data stored in the cache memory 212 with data, which conforms to the write command (S20-2). The FM-CTL 22 references the logical-physical translation table 1500, reserves a free physical page, reads the data, which has been overwritten to the cache memory 212, and writes the data, which has been read, to the reserved physical page (S20-3).

Figure 19:
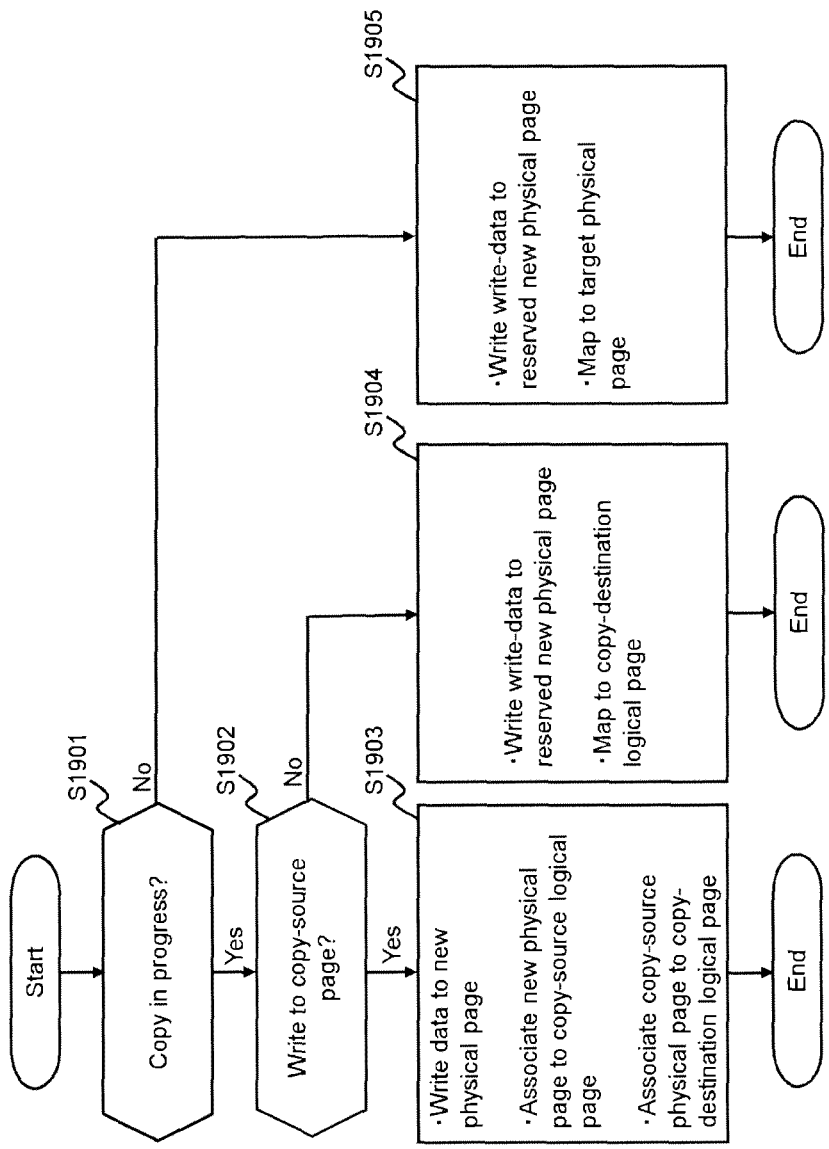
FIG. 19 shows the flow of the write process in the FMPK 21.

FIG. 19 shows the flow of a write process in the FMPK 21. This write process is executed in a case where the FM-CTL 22 of the FMPK 21 has received a write command (write request) from the ST-CTL 10.

The FM-CTL 22 determines whether or not a copy is in progress (S1901). Specifically, the FM-CTL 22 references the logical-physical translation table 1500, and determines whether or not there is a logical page for which the copy status 1504 is "copy in progress".

In a case where the result is that a copy is in progress (S1901: Yes), the FM-CTL 22 determines whether or not the write command sent from the ST-CTL 10 is targeted at the copy-source logical page (S1902). Specifically, the FM-CTL 22 can make this determination in accordance with checking whether or not copy status 1504, which corresponds to the write-target logical page of the write command, is "copy in progress" in the logical-physical translation table 1500.

In a case where the result is a write to the copy-source logical page (S1902: Yes), the FM-CTL 22 executes the following processing based on the write process information 1800. That is, the FM-CTL 22 reserves a new physical page, and writes data, which conforms to the write command, to the reserved physical page (S1903). The FM-CTL 22 associates the physical page to which the data conforming to the write command is written with the copy-source logical page (S1903). In addition, the FM-CTL 22 cancels the association between the copy-destination logical page and the copy-destination physical page so that only the copy-source physical page is associated with the copy-destination logical page (S1903). Thereafter, the FM-CTL 22 changes the physical page status 1202 of the copy-destination physical page in the physical page status management table 1200 to "invalid". This makes it possible to appropriately write the data to the copy-source logical page, and, in addition, to change the copy status by associating the physical page in which the target data is stored with the copy-destination logical page.

Alternatively, in a case where it is not a write to the copy-source logical page (S1902: No), that is, a case in which it is a write to the copy-destination logical page, the FM-CTL 22 executes the following processing based on the write process information 1800. That is, the FM-CTL 22 reserves a new physical page, and writes data, which conforms to the write command, to the reserved physical page (S1904). The FM-CTL 22 associates the physical page to which the data conforming to the write command has been written with the copy-destination logical page (S1904). This makes it possible to appropriately write the data to the copy-destination logical page.

Alternatively, in a case where a copy is not in progress (S1901: No), the FM-CTL 22 executes the following processing based on the write process information 1800. That is, the FM-CTL 22 reserves a new physical page with respect to the write-target logical page, and writes data, which conforms to the write command, to the reserved physical page (S1905). The FM-CTL 22 associates the physical page to which the data conforming to the write command has been written with the write-target-destination logical page (S1905).

FIG. 20 shows transitions in the status of the logical-physical translation table 1500 in a case where a write command for the copy-source logical page has been received while a copy inside the same FMPK 21 is in progress.

—S21-1—

S21-1 shows the status of the logical-physical translation table 1500 at the time point when a data copy from the copy-source physical page to the copy-destination physical page has yet to be performed, and, in addition, a write command for the copy-source logical page has yet to be received from the ST-CTL 10. In this state, the physical page "300" in the physical page #1 1502 is associated with the logical page "1", which is the copy source, in the logical page #1501. Also, the physical page "500" in the physical page #1 1502 is associated with the logical page "100", which is the copy destination, in the logical page #1501.

—S21-2—

S21-2 shows the status of the logical-physical translation table 1500 at the time point when the FM-CTL 22 has received a write command for the copy-source logical page ("1" in the logical page #1501) from the ST-CTL 10 while data is being migrated from the copy-source physical page to the copy-destination physical page. After the time point of S21-1, the FM-CTL 22 reserves the unused physical page "800" in the physical page #1501 for copying the data stored in "300" in the physical page #1 1502 associated with the logical page "1", which is the copy source, in the logical page #1501, and stores this physical page # in physical page #2 1503, which corresponds to the logical page "1" in the logical page #1501. In accordance with this, the physical pages "300" in the physical page #1 1502 and "800" in the physical page #2 1503 are associated with the logical page "1" in the logical page #1501.

The FM-CTL 22 also stores the physical page # "800" in the physical page #1 1502, which corresponds to the logical page "100", which is the copy destination, in the logical page #1501, and, in addition, stores the physical page # "300" in the physical page #2 1503. In accordance with this, the physical pages "800" in the physical page #1 1502 and "300" in the physical page #2 1503 are also associated with the logical page "100" in the logical page #1501 the same as the logical page "1" in the logical page #1501.

After associating two physical pages with the copy-source logical page and the copy-destination logical page like this, the FM-CTL 22 starts the processing for a data copy from the copy-source physical page to the copy-destination physical page. In a case where this copy process has been started, the FM-CTL 22 stores "copy in progress" in the copy status 1504 of the logical page #1501 "1" and the logical page #1501 "100", which are the copy-source logical page and the copy-destination logical page of the copy process. As a result of this, the logical-physical translation table 1500 transitions to the status shown in S21-2 of FIG. 21.

In a case where a write indication for the logical page "1", which is the copy source, in the logical page #1501 has been received while this copy is in progress, the FM-CTL 22 changes the physical page status 1202 of the physical page "800", which is the copy destination, in the physical page #2 1503 to "invalid" in the physical page status management table 1200.

—S21-3—

S21-3 shows the status of the logical-physical translation table 1500 in a state in which a write to the copy-source logical page has ended.

In a case where the FM-CTL 22 has received a write command with respect to the logical page "1", which is the copy source, in the logical page #1501, the FM-CTL 22 cancels the association between the logical page "1", which is the copy source, in the logical page #1501 and the physical page "800" in the physical page #2 1503, references the physical page status management table 1200, and reserves a new physical page (in FIG. 20, physical page #1 1502 "1000"), which is not being used (physical page status 1202 is "free"). The FM-CTL 22 associates the reserved physical page with the logical page "1", which is the copy source, in the logical page #1501 and writes data, which conforms to the write command, to the new physical page (physical page of physical page# "1000"). In accordance with this, as shown in S21-3, the logical-physical translation table 1500 transitions to a state in which the physical page #1 1502 "1000", to which the new write data has been written, is associated with the logical page "1", which is the copy source, in the logical page #1501. That is, the write data has been written to the copy-source logical page.

The FM-CTL 22 also cancels the association between the logical page "100", which is the copy destination, in the logical page #1501 and the physical page "800" in the physical page #1 1502, and moves the physical page #2 1503 "300" to the physical page #1 1502. In accordance with this, the logical-physical translation table 1500 transitions to a state in which the physical page "300", which is the copy source, in the physical page #1 1502 is associated with the logical page "100" in the logical page #1501. That is, the FM-CTL 22 can associate the copy-source physical page with the copy-destination logical page to copy the data of the copy-source logical page to the copy-destination logical page.

A copy process inside the same FMPK 21 has been explained hereinabove. Next, a copy process between FMPK groups will be explained.

Processing in which a copy-source FMPK 21 is the initiator in a copy process between FMPK groups, and copy-target data is written from a copy-source FMPK 21 (copy-source area) to a copy-destination FMPK 21 (copy-destination area) will be explained hereinbelow using FIGS. 21 through 24. Furthermore, FIGS. 25 through 28 show processing in which a copy-destination FMPK 21 is the initiator in a copy process between FMPK groups, data is read from a copy-source FMPK 21 (copy-source area), and the data, which has been read, is written to the copy-destination FMPK 21.

The copy-source FMPK 21 becomes the initiator in a case where the copy-source FMPK 21 and the copy-destination FMPK 21 (or only the copy-source FMPK 21) comprise the direct copy function, and the ST-CTL 10 has sent a CTL copy indication to the copy-source FMPK 21.

The copy-destination FMPK 21 becomes the initiator in a case where the copy-source FMPK 21 and the copy-destination FMPK 21 (or only the copy-destination FMPK 21) comprise the direct copy function, and the ST-CTL 10 has sent a CTL copy indication to the copy-destination FMPK 21.

Figure 21:
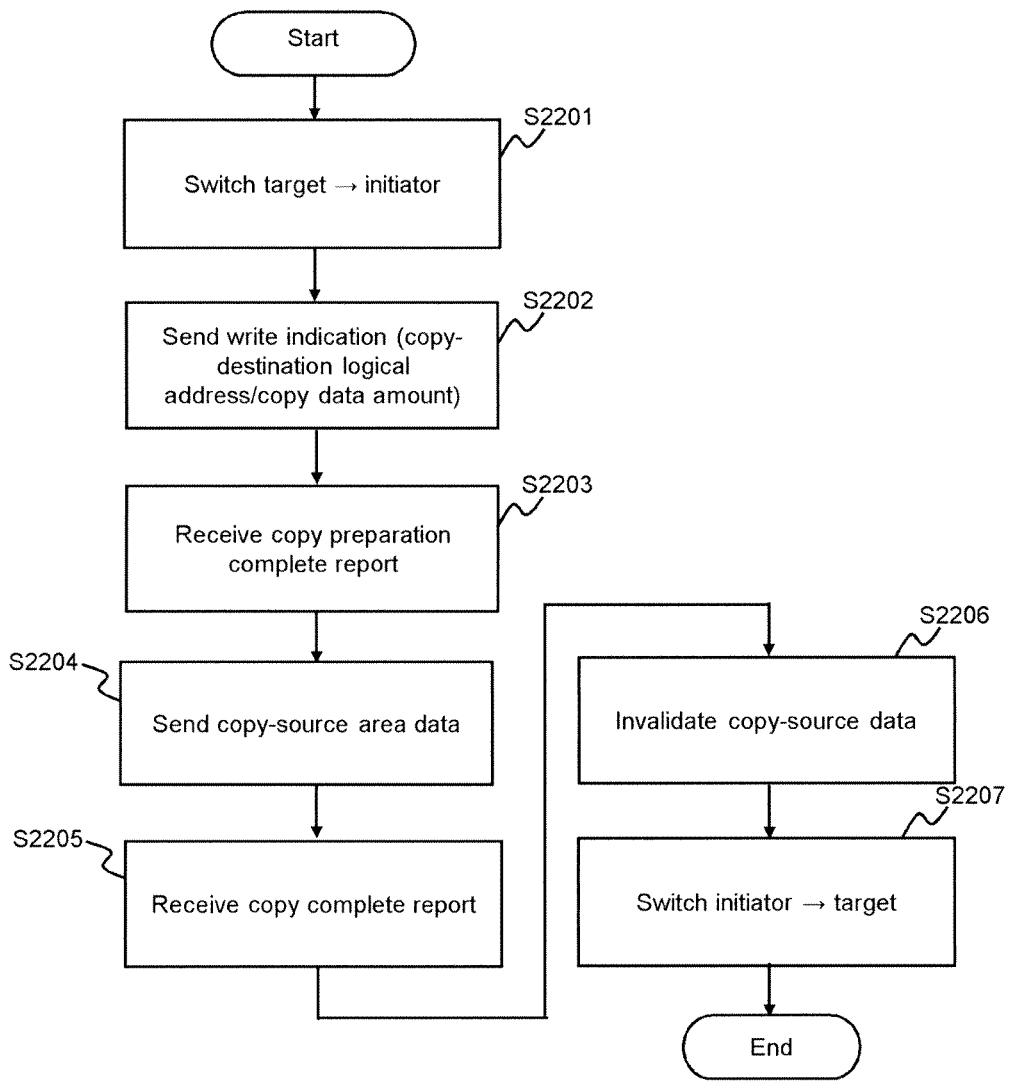
FIG. 21 shows the flow of processing of the copy-source FMPK 21 in a case where the initiator is the copy-source FMPK 21.
Figure 22:
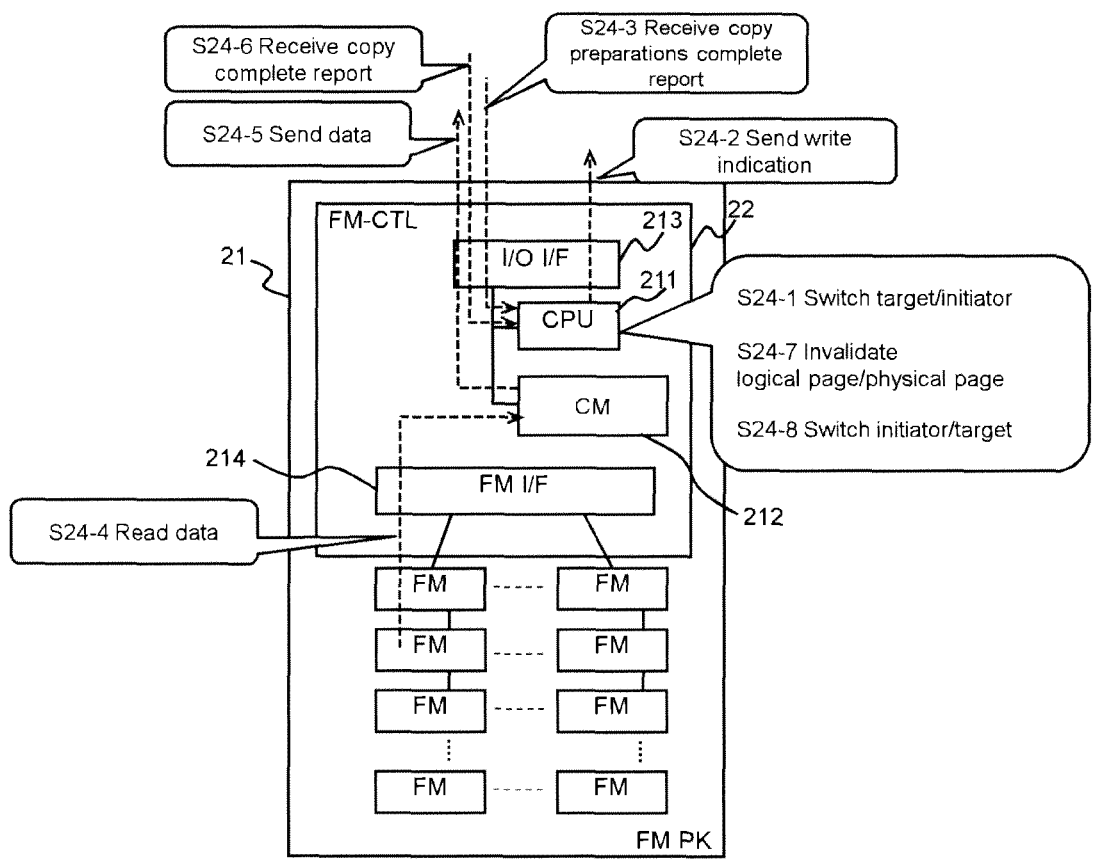
FIG. 22 shows the state of the processing in the copy-source FMPK 21 in a case where the initiator is the copy-source FMPK 21.
Figure 23:
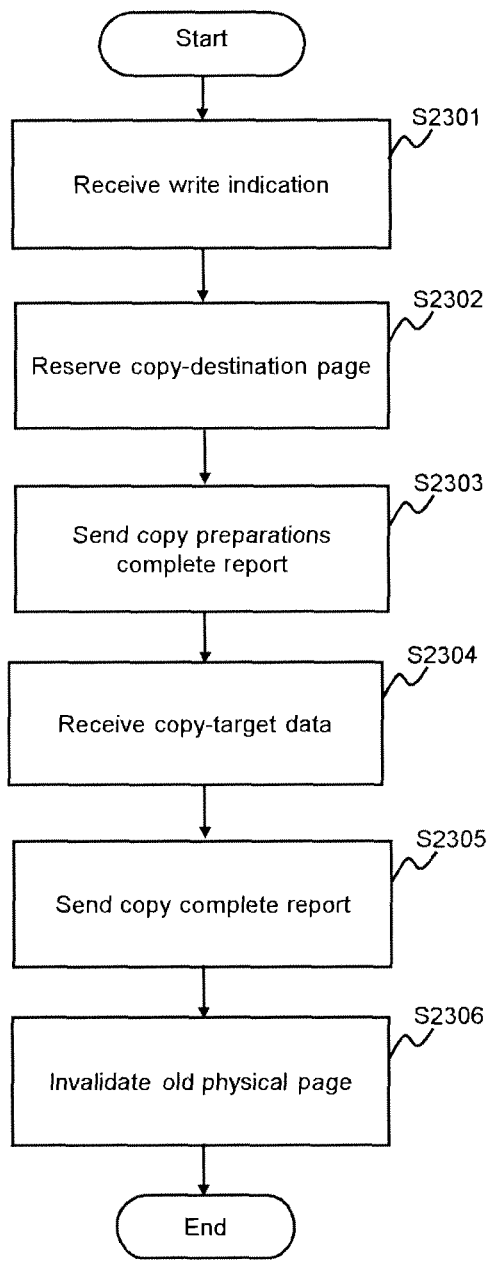
FIG. 23 shows the flow of processing on the copy-destination FMPK 21 side in a case where the initiator is the copy-source FMPK 21.

FIG. 21 shows the flow of processing in the copy-source FMPK 21 in a case where the initiator is the copy-source FMPK 21. FIG. 23 shows the state of the processing inside the copy-source FMPK 21 in a case where the initiator is the copy-source FMPK 21.

The FM-CTL 22 of the copy-source FMPK 21 (specifically, the CPU 211, hereinafter, the copy-source CPU 211) receives from the ST-CTL 10 a CTL copy indication for copying stored data to another FMPK 2L Thereafter, the FM-CTL 22 of the copy-source FMPK 21 (copy-source CPU 211) switches the copy-source FMPK 21 (I/O I/F 213) from the target to the initiator in order to send a write indication to the copy-destination FMPK 21 (S2201, S24-1).

The copy-source FM-CTL 22 sends the write indication to the copy-destination FMPK 21 through the I/O I/F 213 (S2202, S24-2). The write indication includes at the least a logical address that will become the copy destination and the data amount of the copy-target data to be copied. The copy-source FM-CTL 22 receives through the I/O I/F 213 a copy preparation complete report from the copy-destination FMPK 21, which sent the write indication in S2202 (S2203, S24-3).

The copy-source FM-CTL 22 sends F to the copy-destination FMPK 21, which sent the copy preparation complete report (S2204). Specifically, the copy-source CPU 211 reads the copy-source area data from the FM chip 216 through the FM I/F 214, stores this read data in the cache memory 212 (S24-4), and sends the data (the copy-target data), which has been stored in the cache memory 212, to the copy-destination FMPK 21 (copy-destination area) through the I/O I/F 213 (S24-5).

The copy-source FM-CTL 22 receives through the PO UF 213 a copy complete report from the copy-destination FMPK 21, which sent the copy-target data in S2204 (S2205, S24-6). The copy-destination FMPK 21 sends the copy complete report to the copy-source FMPK 21 after the copy process has ended (after the copy-target data has been written).

The copy-source FM-CTL 22 changes the copy-source data (copy-source area data) to invalid (S2206, S24-7). Specifically, the FM-CTL 22 changes the physical page status 1202 of the physical page, which is storing the copy-source data, to "invalid" in the physical page status management table 1200. The processing of S2206 and S24-7 is performed in a case where a copy is performed for the purpose of migrating data, such as a volume migration (refer to FIG. 3). Furthermore, since there is no need to secure the source data when performing a process such as a flash copy, the processing of S2206 is not performed.

The copy-source FM-CTL 22 switches the copy-source FMPK 21 (I/O OF 213) from the initiator to the target in order to receive a command from the ST-CTL 10 (S2207, S24-8), and ends the processing.

Figure 24:
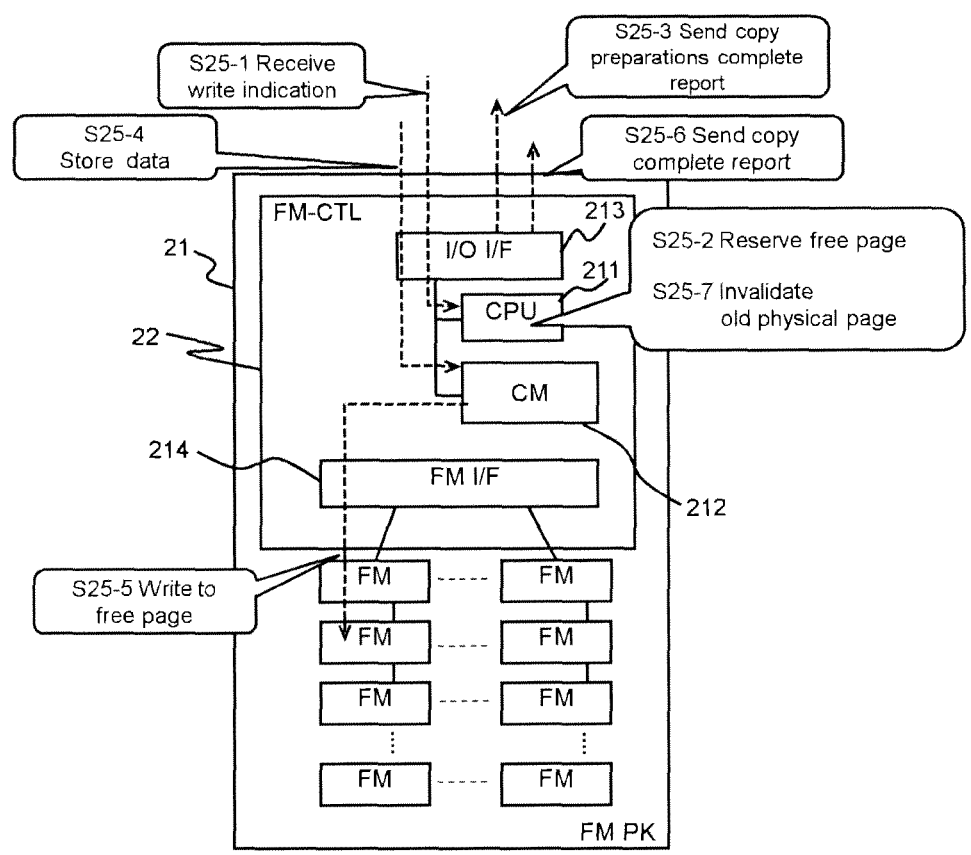
FIG. 24 shows the state of the processing inside the copy-destination FMPK 21 in a case where the initiator is the copy-source FMPK 21.

FIG. 23 shows the flow of processing on the copy-destination FMPK 21 side in a case where the initiator is the copy-source FMPK 21. FIG. 24 shows the state of the processing inside the copy-destination FMPK 21 in a case where the initiator is the copy-source FMPK 21.

The copy-destination FMPK 21 (the CPU 221 of the copy-destination FM-CTL 22 (hereinafter, copy destination CPU 221)) receives a write indication from the copy-source FMPK 21 through the I/O I/F 213 (S2301, S25-1). The write indication includes at the least the logical address of the copy-destination logical page and the data amount of the copy-target data.

The copy-destination FM-CTL 22 reserves a free physical page that will become the copy destination page (S2302, S25-2). Specifically, the copy-destination FM-CTL 22 references the physical page status management table 1200 and selects any physical page for which the physical page status 1202 is "free".

Since preparations for copying have been completed in accordance with reserving the physical page and allocating the reserved physical page to the copy-destination logical page, the copy-destination FM-CTL 22 sends a copy preparations complete report to the copy-source FMPK 21, which sent the write indication, through the I/O I/F 213 (S2303, S25-3).

The copy-destination FM-CTL 22 receives the copy-target data from the copy-source FMPK 21, which sent the write indication, and writes the received copy-target data to the physical page that has been allocated to the copy-destination logical page (the reserved physical page) (S2304). Specifically, the copy-destination CPU 211 stores the copy-target data from the copy-source FMPK 21 in the cache memory 212 through the I/O I/F 213 (S25-4), reads the copy-target data from the cache memory 212, and writes the copy-target data, which has been read, to the physical page (FM chip 216) reserved in S2302, S25-2 through the FM I/F 214 (S25-5). In accordance with this, the data in the copy-source logical page is copied to the copy-destination logical page.

The copy-destination FM-CTL 22, after copying is complete, sends a copy complete report to the copy-source FMPK 21, which sent the copy-target data, through the I/O I/F 213 (S2305, S25-6).

The copy-destination FM-CTL 22 changes the physical page, which is storing the old data, to invalid (S2306, S25-7). Specifically, the copy-destination FM-CTL 22 changes the physical page status 1202 of the old data-storing physical page in the physical page status management table 1200 to "invalid". The processing of S2306 is performed in a case where the copy-source FMPK 21 receives from the ST-CTL 10 a command for writing new data to the copy-source logical page, and updates the copy source data. Therefore, the processing of S2306 is not performed in a case where data is initially copied from the copy-source logical page to the copy-destination logical page.

Figure 25:
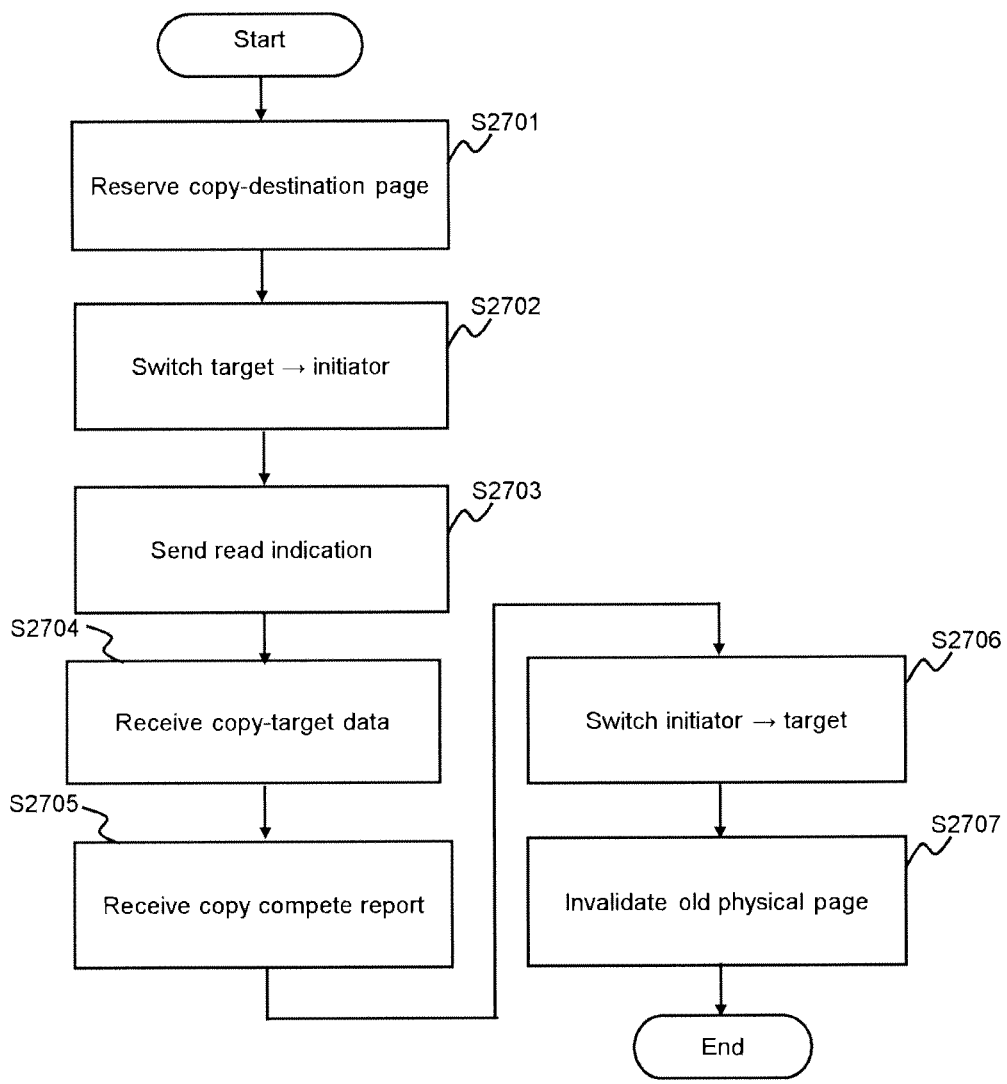
FIG. 25 shows the flow of processing on the copy-destination FMPK 21 side in a case where the initiator is the copy-destination FMPK 21.
Figure 26:
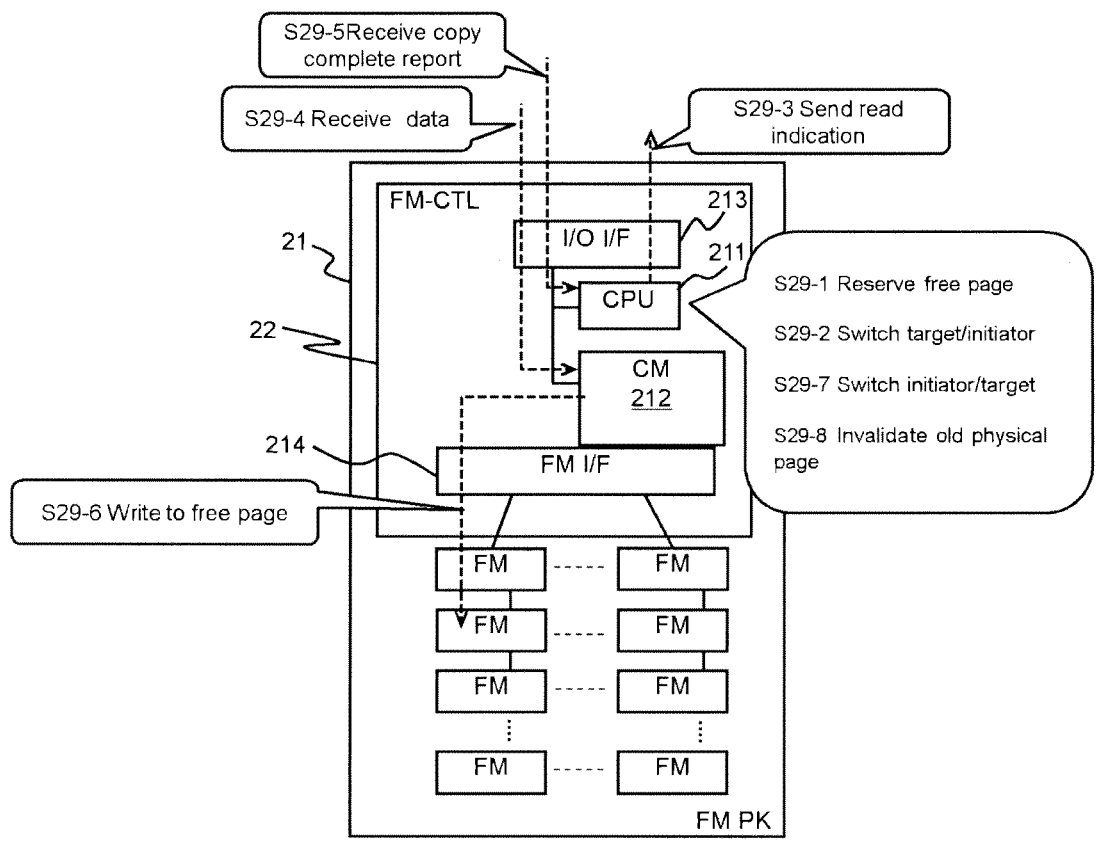
FIG. 26 shows the state of the processing inside the copy-destination FMPK 21 in a case where the initiator is the copy-destination FMPK 21.

FIG. 25 shows the flow of processing on the copy-destination FMPK 21 side in a case where the initiator is the copy-destination FMPK 21. FIG. 26 shows the state of the processing inside the copy-destination FMPK 21 in a case where the initiator is the copy-destination FMPK 21.

The copy-destination FM-CTL 22 (specifically, the copy destination-CPU 211) reserves a physical page that will become the copy destination page (S2701, S29-1). Specifically, the copy-destination FM-CTL 22 references the physical page status management table 1200 and selects any physical page for which the physical page status 1202 is "free".

The copy-destination FM-CTL 22 switches the copy-destination FMPK 21 (I/O I/F 213) from target to initiator in order to send a read indication to the copy-source FMPK 21 (S2702, S29-2).

The copy-destination FM-CTL 22 sends, to the copy-source FMPK 21, a read indication for reading the copy-target data from the copy-source FMPK 21 and sending the data, which has been read (S2703, S29-3). The read indication includes at the least a logical address belonging to the copy source area, the data amount of the copy-target data, and an indication to read the copy-target data from the copy-source area and send this data to the copy-destination FMPK 21 (copy-destination area).

The copy-destination FM-CTL 22 receives the copy-target data from the copy-source FMPK 21 through the I/O I/F 213, and stores the copy-target data in the cache memory 212 (S2704, S29-4). Thereafter, the copy-destination FM-CTL 22 receives a copy complete report showing that the copy has been completed, from the copy-source FMPK 21 through the I/O I/F 213 (S2705, S29-5).

The copy-destination FM-CTL 22 writes the copy-target data, which was stored in the cache memory 212, to the FM chip 216 through the FM I/F 214 (S29-6), and switches the copy-destination FMPK 21 (I/O I/F 213) from initiator to target in order to receive an indication from the ST-CTL 10 (S2706, S29-7). Next, the copy-destination FM-CTL 22 changes the physical page, which is storing the old data, to invalid (S2707, S29-8). Furthermore, the processing of S2707, the same as the processing of S2306, is not performed in a case where a data copy is initially performed from the copy-source logical page to the copy-destination logical page.

Figure 27:
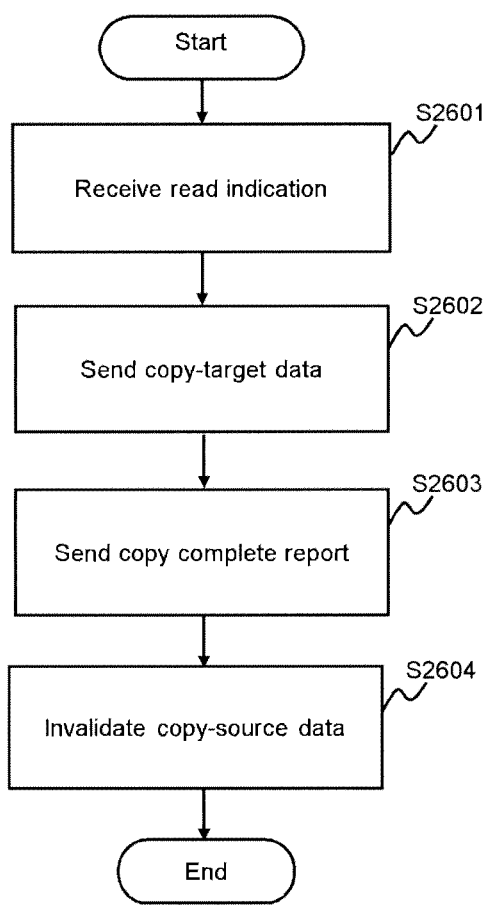
FIG. 27 shows the flow of processing of the copy-source FMPK 21 in a case where the initiator is the copy-destination FMPK 21.
Figure 28:
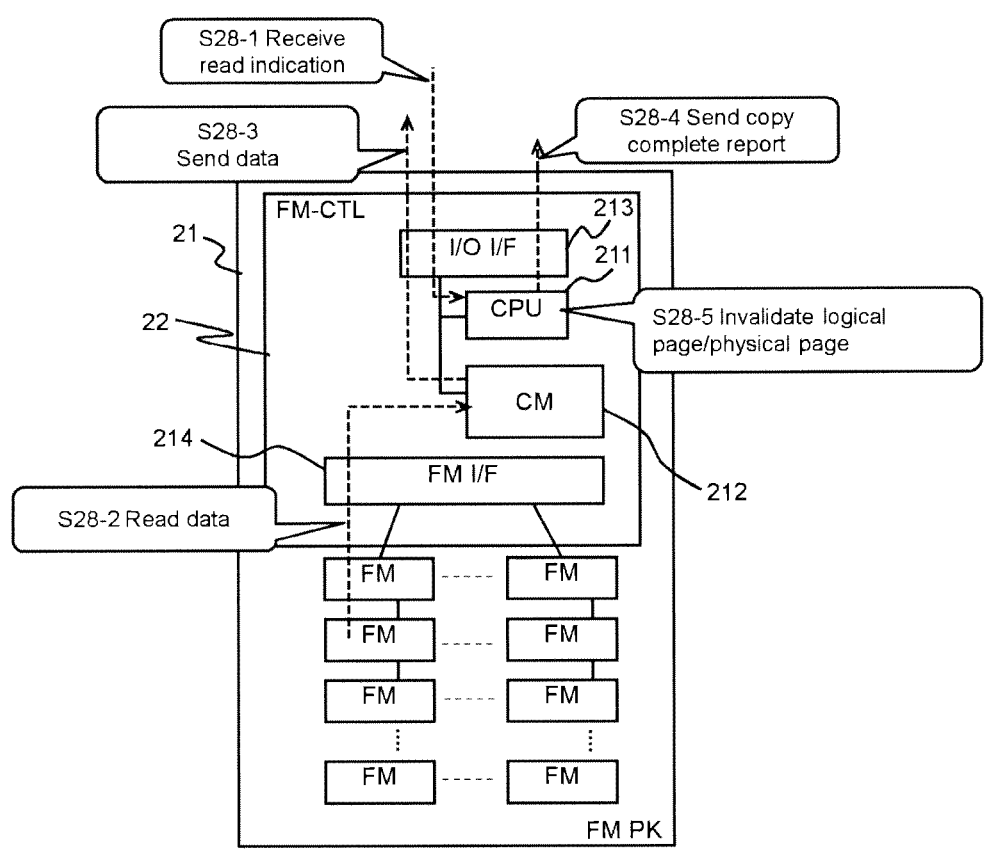
FIG. 28 shows the state of the processing inside the copy-source FMPK 21 in a case where the initiator is the copy-destination FMPK 21.

FIG. 27 shows the flow of processing of the copy-source FMPK 21 in a case where the initiator is the copy-destination FMPK 21. FIG. 28 shows the state of the processing inside the copy-source FMPK 21 in a case where the initiator is the copy-destination FMPK 21.

The FM-CTL 22 of the copy-source FMPK 21 (copy source CPU 211) receives a read indication through the I/O I/F 213 from the copy-destination FMPK 21, which is the initiator (S2601, S28-1). The read indication includes at least a copy source logical address, the data amount of the copy-target data, and an indication to read the copy-target data from the physical page and send this data to the copy-destination FMPK 21.

The copy-source FM-CTL 22 reads the copy-target data from the physical page and sends this data to the copy-destination FMPK 21 (S2602). Specifically, the copy-source FM-CTL 22 reads the copy-target data from the FM chip 216, stores the copy-target data, which has been read, in the cache memory 212 (S28-2), and sends the copy-target data, which has been stored in the cache memory 212, to the copy-destination FMPK 21 through the I/O I/F 213 (S28-3).

The copy-source FM-CTL 22 sends a copy complete report to the copy-destination FMPK 21 through the I/O I/F 213 in order to communicate the fact that the copy-target data has been sent to the copy-destination FMPK 21 (S2603, S28-4).

The copy-source FM-CTL 22 changes the copy source data to invalid (S2604, S28-5). Specifically, the FM-CTL 22 changes the physical page status 1202 of the physical page, which is storing the copy source data, to "invalid" in the physical page status management table 1200. Furthermore, the processing of S2604, like the processing of S2206, is performed in a case where a copy is performed for the purpose of migrating data, such as a volume migration (refer to FIG. 3).

Figure 29:
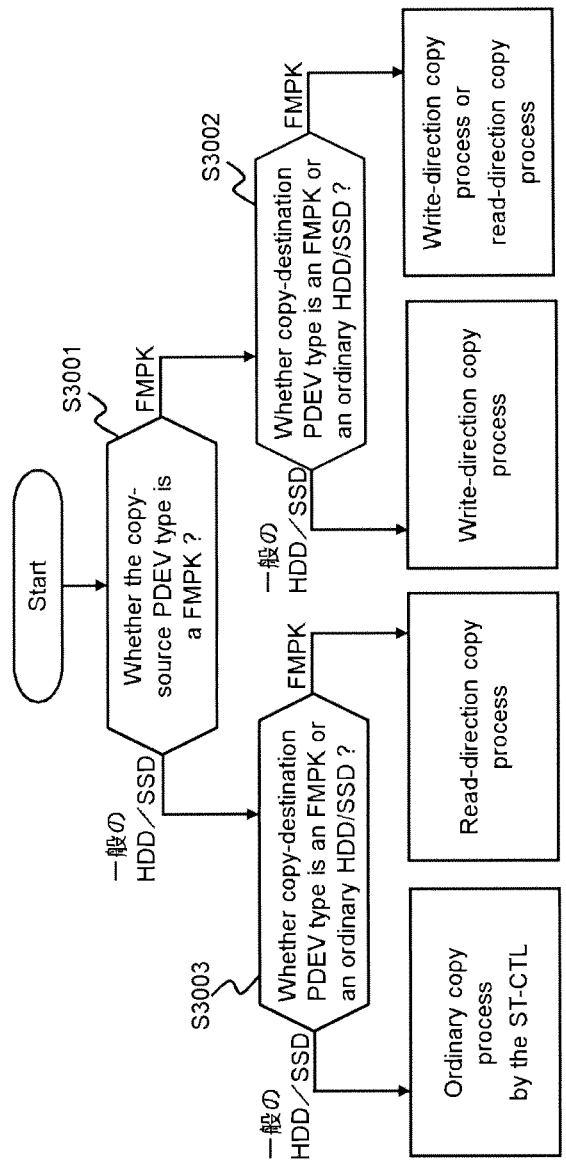
FIG. 29 shows an example of a flow for determining a copy process, which is executed in a case where the FMPK 21, HDD and SSD are intermixed as the storage devices of a storage part 20.

FIG. 29 shows an example of a flow for determining a copy process, which is executed in a case where the FMPK 21, the HDD, and the SSD are intermixed as the storage devices of the storage part 20.

The computer system (ST-CTL 10) of this example, when performing a copy process between packages, determines whether the copy-source PDEV type is a FMPK, which comprises the direct copy function, or an ordinary HDD/SSD (S3001).

In a case where the result of the determination in S3001 is that the copy-source PDEV type is FMPK, the computer system (ST-CTL 10) determines whether the copy-destination PDEV type is an FMPK or an ordinary HDD/SSD (S3002).

In a case where the result of the determination in S3002 is that the copy-destination PDEV type is FMPK, the computer system (ST-CTL 10) determines that a copy process can be executed on the package side, and that either a copy process in which the copy-source FMPK 21 is the initiator (a write-direction copy process) or a copy process in which the copy-destination FMPK 21 is the initiator (a read-direction copy process) can be executed. In accordance with this, the ST-CTL 10 sends a CTL copy indication to either one of the copy-source FMPK 21 or the copy-destination FMPK 21.

In a case where the result of the determination in S3002 is that the copy-destination PDEV type is an ordinary HDD/SSD, the computer system (ST-CTL 10) determines that a copy process can be executed on the package side, and that a copy process in which the copy-source FMPK 21 is the initiator (a write-direction copy process) can be executed. In accordance with this, the ST-CTL 10 sends a CTL copy indication to the copy-source FMPK 21.

In a case where the result of the determination in S3001 is that the copy-source PDEV type is an ordinary HDD/SSD, the computer system (ST-CTL 10) determines whether the copy-destination PDEV type is an FMPK or an ordinary HDD/SSD (S3003).

In a case where the result of the determination in S3003 is that the copy-destination PDEV type is an ordinary HDD/SSD, the computer system (ST-CTL 10) determines that a copy process cannot be executed on the package side, and that only an ordinary copy process by the ST-CTL 10 is executable. In accordance with this, the ST-CTL 10 executes an ordinary copy process without sending a CTL copy indication to the FMPK 21.

In a case where the result of the determination in S3003 is that the copy-destination PDEV type is an FMPK, the computer system (ST-CTL 10) determines that a copy process can be executed on the package side, and that a copy process in which the copy-destination FMPK 21 is the initiator (a read-direction copy process) can be executed. In accordance with this, the ST-CTL 10 sends a CTL copy indication to the copy-destination FMPK 21.

As processing prior to performing the above-described processing, the ST-CTL 10 can make a determination as to whether or not the RAID configuration of the RG forming the copy-destination area (copy-destination area) is the same as the RAID configuration of the RG forming the copy-source area (copy-source area) included in the host copy indication from the host computer 2. In a case where the result of the determination is that the RAID configurations are different, the ST-CTL 10 may perform an ordinary copy process without performing the above-described processing, and may send an error to the host computer 2.

Figure 30:
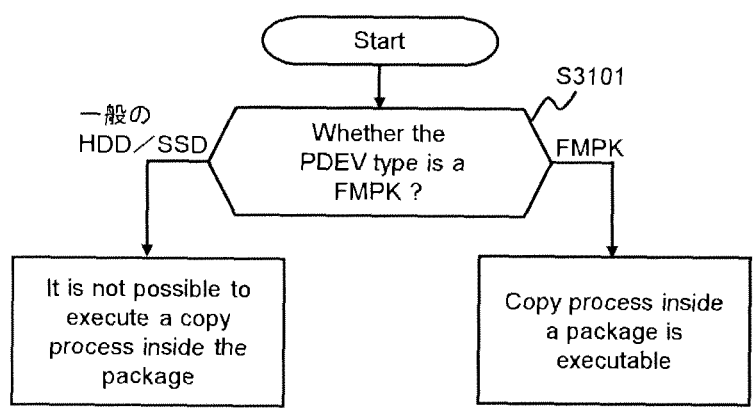
FIG. 30 shows an example of a flow for determining whether or not an in-package copy process is possible with respect to the package.

FIG. 30 shows an example of a flow for determining for a package whether or not a copy process is possible inside the package.

The storage apparatus 1 of this example, when performing a copy process inside a package, determines whether the PDEV type, which will perform a copy process, is a FMPK or an ordinary HDD/SSD (S3101).

In a case where the result of the determination in S3101 is that the package is a FMPK, the storage apparatus 1 determines that a copy process inside a package is executable. Alternatively, in a case where the package is an ordinary HDD/SSD, the storage apparatus 1 determines that it is not possible to execute a copy process inside the package, and that an ordinary copy process by the ST-CTL 10 is necessary.

Example 2

Next, a computer system related to a second example will be explained. In explaining the second example, the explanation will focus on the points of difference with the computer system related to the first example, and explanations of the points in common with the computer system related to the first example will be either simplified or omitted.

Figure 31:
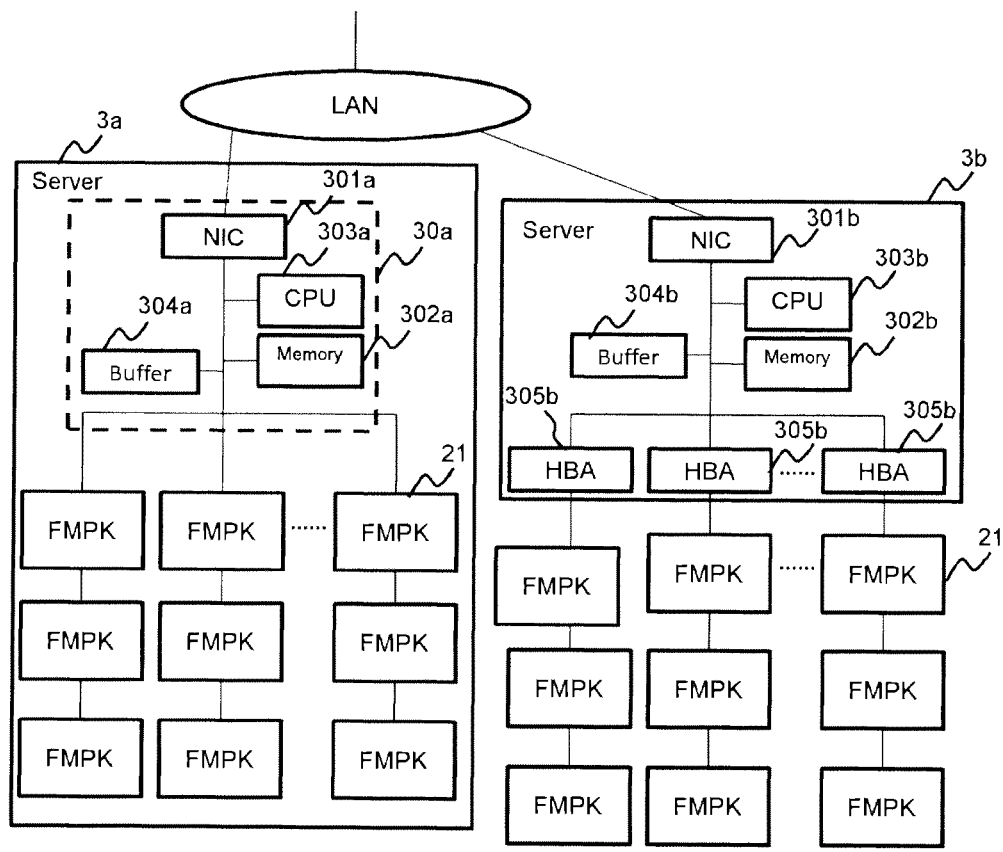
FIG. 31 shows an example of the configuration of a computer system related to a second example.

FIG. 31 shows an example of the configuration of the computer system related to the second example. In the computer system related to the second example, like reference signs are appended to like components of the computer system related to the first example.

The computer system related to the second example comprises servers 3a and 3b. The server 3a comprises multiple FMPKs 21. Alternatively, the server 3b does not comprise an FMPK 21, but rather is coupled to FMPKs 21 on the outside. Thus, FMPKs 21 can be directly coupled in the servers 3a and 3b without going through the ST-CTL 10.

The server 3a and the server 3b are coupled through a communication network, for example, a LAN (Local Area Network).

The server 3a comprises a server controller 30a and multiple FMPKs 21, which are coupled to the server controller 30a. The server controller 30a comprises a NIC (Network Interface Card) 301a for coupling to the LAN or other such communication network, a memory 302a, a CPU 303a, and a buffer 304a. The server controller 30a comprises the same functions as the ST-CTL 10 related to the first example.

The server 3b comprises a NIC 301b for coupling to the LAN or other such communication network, a HBA (Host Bus Adapter) 305b for coupling to the FMPK 21, a memory 302b, a CPU 303b, and a buffer 304b. The server 3b comprises the same functions as the ST-CTL 10 related to the first example.

In the server controller 30a and in the server 3b, a program and various information for controlling the FMPK 21 are stored in the memories 302a and 302b. The CPUs 303a and 303b realize various functions in accordance with executing the program based on the information stored in the memories 302a and 302b. Both the server controller 30a and the server 3b may exercise RAID control using the multiple FMPKs 21 coupled to itself. One of the server 3a and the server 3b may issue an IO request to the other through the LAN, and may issue an IO request to a FMPK 21 coupled to itself.

According to the computer system related to the second example, the server controller 30a and the server 3b are able to perform the same processing as the ST-CTL 10 related to the first example, thereby making it possible to lessen the load on the server controller 30a and the server 3b at the time of a data copy.

A number of examples have been explained hereinabove, but these examples are merely an example, and the present invention is applicable in a variety of other modes.

For example, the copy process may be performed without a copy indication, such as the host copy indication, from an apparatus outside of the storage apparatus 1. For example, the storage apparatus 1 can copy data from an area inside a copy-source LU to an area inside a copy-destination LU for the purpose of acquiring a snapshot or backing up data. At this time, the storage area in the FMPK 21, which constitutes the basis of an area inside the copy-source LU, becomes the CTL-specified copy-source area, and the storage area in the FMPK 21, which constitutes the basis of an area inside the copy-destination LU, becomes the CTL-specified copy-destination area.

REFERENCE SIGNS LIST

1 Storage apparatus
2 Host computer
10 ST-CTL
20 Storage part
21 FMPK

The invention claimed is:

1. A storage apparatus, comprising:
 a storage controller; and
 multiple storage devices, wherein
 the storage controller is configured to send, to either a storage device which is a copy source of copy-target data, or a storage device which is a copy destination of the copy-target data, a copy indication showing areas of the copy source and the copy destination;
 the storage device to which the copy indication is sent is a write once read many-type storage device, which comprises multiple nonvolatile semiconductor storage media, and
 a first physical area, which is a physical area, is associated with the copy-source area, and the copy-target data is stored in the first physical area;
 the storage device is configured to associate the first physical area with the copy-destination area, reserve a second physical area, which is a new physical area, and associate the second physical area with the copy-source area and the copy-destination area;

when the copy-source storage device and the copy-destination storage device are the same storage device, the storage controller is configured to send the copy indication to the storage device, the storage device, which receives the copy indication, is configured to copy data of the copy-source area to the copy-destination area based on the copy indication without going through the storage controller; and when a write request for writing update data to the copy-source area is received when copying of the copy-target data from the copy-source area to the copy-destination area has not ended, the storage device is configured to cancel the association between the copy-destination area and the second physical area, cancel the association between the copy-source area and the first physical area, reserve a third physical area, which is a new physical area, associate the third physical area with the copy-source area, and write the update data to the third physical area.

2. A storage apparatus according to claim 1, wherein when a read request for reading the copy-target data to the copy-source area is received when copying of the copy-target data from the copy-source area to the copy-destination area has not ended, the storage device is configured to read the copy-target data from the first physical area, which is associated with the copy-source area.

3. A storage apparatus according to claim 1, wherein when a read request for reading the copy-target data to the copy-destination area is received when copying of the copy-target data from the copy-source area to the copy-destination area has not ended, the storage device is configured to read the copy-target data from the first physical area, which is associated with the copy-destination area.

4. A storage apparatus according to claim 1, wherein the storage controller is configured to determine whether the storage device is able to execute a data copy from the copy-source area to the copy-destination area without going through the storage controller, and send the copy indication to the storage device when the storage device is able to execute a data copy from the copy-source area to the copy-destination area without going through the storage controller.

5. A storage apparatus according to claim 4, wherein when the storage device is not able to execute a data copy from the copy-source area to the copy-destination area without going through the storage controller, the storage controller is configured to read the copy-target data from the copy-source area and write the copy-target data to the copy-destination area.

6. A storage apparatus according to claim 1, wherein the copy-source storage device and the copy-destination storage device are different storage devices,
the storage controller is configured to send the copy indication to the copy-destination storage device, and
the copy-destination storage device, based on the copy indication, is configured to send a read request for data of the copy-source area to the copy-source storage device, and write data, which has been read in response to the read request, to the copy-destination area.

7. A storage apparatus according to claim 1, wherein the copy-source storage device and the copy-destination storage device are different storage devices,
the storage controller is configured to send the copy indication to the copy-source storage device, and
the copy-source storage device is configured to read the copy-target data from the copy-source area, and write the data to the copy-destination area by sending, to the copy-destination storage device, a write request for writing the read data to the copy-destination area.

8. A storage apparatus according to claim 1, wherein the copy-source storage device and the copy-destination storage device are different storage devices,
the storage controller is configured to determine whether the copy-source storage device and/or the copy-destination storage device is/are able to execute a data copy from the copy-source area to the copy-destination area without going through the storage controller, and
when it is determined that at least one of the copy-source storage device and the copy-destination storage device is able to execute a data copy from the copy-source area to the copy-destination area without going through the storage controller, send the copy indication to either the copy-source storage device or the copy-destination storage device, which has been determined to be able to able to execute a data copy from the copy-source area to the copy-destination area without going through the storage controller.

9. A storage apparatus according to claim 8, wherein the storage controller is configured to determine whether either the copy-source storage device or the copy-destination storage device has a function for executing a data copy to another storage device, and determine whether the copy-source storage device and the copy-destination storage device are communicably coupled without going through the storage controller, and
when it is determined that either the copy-source storage device or the copy-destination storage device has a function for executing a data copy to another storage device, and it is determined that the copy-source storage device and the copy-destination storage device are communicably coupled without going through the storage controller, the storage controller is configured to determine that a data copy from the copy-source area to the copy-destination area can be executed.

10. A data copy control method by a storage apparatus, which comprises a storage controller and multiple storage devices, the copy data method comprising the steps of:
the storage controller sending, to either a storage device which is a copy source of copy-target data, or a storage device which is a copy destination of the copy-target data, a copy indication showing areas of the copy source and the copy destination;
the storage device to which the copy indication is sent is a write once read many-type storage device, which comprises multiple nonvolatile semiconductor storage media, and
a first physical area, which is a physical area, is associated with the copy-source area, and the copy-target data is stored in the first physical area;
the storage device associating the first physical area with the copy-destination area, reserving a second physical area, which is a new physical area, and associating the second physical area with the copy-source area and the copy-destination area and
when the copy-source storage device and the copy-destination storage device are the same storage device, the storage controller sending the copy indication to the storage device, the storage device, which receives the copy indication, copying data of the copy-source area to the copy-destination area based on the copy indication without going through the storage controller; and
when a write request for writing update data to the copy-source area is received when copying of the copy-target data from the copy-source area to the copy-destination area has not ended, the storage device canceling the association between the copy-destination area and the second physical area, canceling the association between the copy-source area and the first physical area, reserving a third physical area, which is a new physical area, associating the third physical area with the copy-source area, and writing the update data to the third physical area.

11. A storage apparatus, comprising:
a storage controller; and
multiple storage devices, wherein
the storage controller is configured to send, to either a storage device which is a copy source of copy-target data, or a storage device which is a copy destination of the copy-target data, a copy indication showing areas of the copy source and the copy destination;
the storage device to which the copy indication is sent is a write once read many-type storage device, which comprises multiple nonvolatile semiconductor storage media, and
a first physical area, which is a physical area, is associated with the copy-source area, and the copy-target data is stored in the first physical area;
the storage device is configured to associate the first physical area with the copy-destination area, reserve a second physical area, which is a new physical area, and associate the second physical area with the copy-source area and the copy-destination area; and
when the copy-source storage device and the copy-destination storage device are the same storage device, the storage controller is configured to send the copy indication to the storage device, the storage device, which receives the copy indication, is configured to copy data of the copy-source area to the copy-destination area based on the copy indication without going through the storage controller; and
when a write request for writing update data to the copy-destination area is received when copying of the copy-target data from the copy-source area to the copy-destination area has not ended, the storage device is configured to cancel the association between the copy-destination area and the first physical area, cancel the association between the copy-source area and the second physical area, reserve a third physical area, which is a new physical area, associate the third physical area with the copy-destination area, and write the update data to the third physical area.

12. The storage apparatus according to claim 11, wherein when a read request for reading the copy-target data to the copy-source area is received when copying of the copy-target data from the copy-source area to the copy-destination area has not ended, the storage device is configured to read the copy-target data from the first physical area, which is associated with the copy-source area.

13. The storage apparatus according to claim 11, wherein when a read request for reading the copy-target data to the copy-destination area is received when copying of the copy-target data from the copy-source area to the copy-destination area has not ended, the storage device is configured to read the copy-target data from the first physical area, which is associated with the copy-destination area.

14. The storage apparatus according to claim 11, wherein the storage controller is configured to determine whether the storage device is able to execute a data copy from the copy-source area to the copy-destination area without going through the storage controller, and send the copy indication to the storage device when the storage device is able to execute a data copy from the copy-source area to the copy-destination area without going through the storage controller.

15. The storage apparatus according to claim 14, wherein when the storage device is not able to execute a data copy from the copy-source area to the copy-destination area without going through the storage controller, the storage controller is configured to read the copy-target data from the copy-source area and write the copy-target data to the copy-destination area.

16. The storage apparatus according to claim 11, wherein the copy-source storage device and the copy-destination storage device are different storage devices,
the storage controller is configured to send the copy indication to the copy-destination storage device, and
the copy-destination storage device, based on the copy indication, is configured to send a read request for data of the copy-source area to the copy-source storage device, and write data, which has been read in response to the read request, to the copy-destination area.

17. The storage apparatus according to claim 11, wherein the copy-source storage device and the copy-destination storage device are different storage devices,
the storage controller is configured to send the copy indication to the copy-source storage device, and
the copy-source storage device is configured to read the copy-target data from the copy-source area, and write the data to the copy-destination area by sending, to the copy-destination storage device, a write request for writing the read data to the copy-destination area.

18. The storage apparatus according to claim 11, wherein the copy-source storage device and the copy-destination storage device are different storage devices,
the storage controller is configured to determine whether the copy-source storage device and/or the copy-destination storage device is/are able to execute a data copy from the copy-source area to the copy-destination area without going through the storage controller, and
when it is determined that at least one of the copy-source storage device and the copy-destination storage device is able to execute a data copy from the copy-source area to the copy-destination area without going through the storage controller, send the copy indication to either the copy-source storage device or the copy-destination storage device, which has been determined to be able to able to execute a data copy from the copy-source area to the copy-destination area without going through the storage controller.

19. The storage apparatus according to claim 18, wherein the storage controller is configured to determine whether either the copy-source storage device or the copy-destination storage device has a function for executing a data copy to another storage device, and determine whether the copy-source storage device and the copy-destination storage device are communicably coupled without going through the storage controller, and
when it is determined that either the copy-source storage device or the copy-destination storage device has a function for executing a data copy to another storage device, and it is determined that the copy-source storage device and the copy-destination storage device are communicably coupled without going through the storage controller, the storage controller is configured to determine that a data copy from the copy-source area to the copy-destination area can be executed.

20. The data copy control method by a storage apparatus according to claim 10, wherein
when a write request for writing update data to the copy-destination area is received when copying of the copy-target data from the copy-source area to the copy-destination area has not ended, the storage device canceling the association between the copy-destination area and the first physical area, canceling the association between the copy-source area and the second physical area, reserving a third physical area, which is a new physical area, associating the third physical area with the copy-destination area, and writing the update data to the third physical area.

* * * * *